US010802885B2

(12) United States Patent
Lee et al.

(10) Patent No.: US 10,802,885 B2
(45) Date of Patent: Oct. 13, 2020

(54) METHOD AND APPARATUS FOR DATA PROCESSING BASED ON MULTICORE

(71) Applicant: Samsung Electronics Co., Ltd., Suwon-si, Gyeonggi-do (KR)

(72) Inventors: Wonbo Lee, Suwon-si (KR); Young Ki Hong, Seoul (KR); Youngwook Kim, Seoul (KR); Jung-Hwan Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 15/982,633

(22) Filed: May 17, 2018

(65) Prior Publication Data

US 2018/0336067 A1 Nov. 22, 2018

(30) Foreign Application Priority Data

May 17, 2017 (KR) .................. 10-2017-0061214
May 17, 2017 (KR) .................. 10-2017-0061263

(51) Int. Cl.
*G06F 9/50* (2006.01)
*H04L 12/851* (2013.01)
(Continued)

(52) U.S. Cl.
CPC ............ *G06F 9/505* (2013.01); *G06F 9/5038* (2013.01); *H04L 47/125* (2013.01); *H04L 47/193* (2013.01); *H04L 47/2441* (2013.01)

(58) Field of Classification Search
CPC ... G06F 9/505; H04L 47/193; H04L 47/2441; H04L 47/125
See application file for complete search history.

(56) References Cited

U.S. PATENT DOCUMENTS 7,990,974 B1 8/2011 Gmuender et al.
8,798,034 B2 * 8/2014 Aggarwal ............. H04L 45/123
370/229

(Continued)

FOREIGN PATENT DOCUMENTS

KR 10-2011-0065942 A 6/2011

OTHER PUBLICATIONS

"TCP Ordo: The cost of ordered processing in TCP servers", XP032930235, Apr. 10, 2016.
(Continued)

*Primary Examiner* — Jacob D Dascomb
(74) *Attorney, Agent, or Firm* — Jefferson IP Law, LLP

(57) ABSTRACT

A communication technique for combining a fifth generation (5G) communication system that supports higher data transmission rates after fourth generation (4G) systems with Internet of things (IoT) technology and to the system therefor are provided. The disclosure relates to a multiple cores-based data processing method and apparatus, the method including determining whether a condition for a first packet flow among one or more packet flows for data communication is met, if the condition is met, selecting cores to distribute packets of the first packet flow from among the multiple cores, allocating packets received through the first packet flow to the selected cores, and operating the selected cores in parallel to process the packets allocated from the first packet flow.

18 Claims, 18 Drawing Sheets

(51) Int. Cl.
*H04L 12/801* (2013.01)
*H04L 12/803* (2013.01)

(56) References Cited

U.S. PATENT DOCUMENTS

2014/0351447 A1* 11/2014 Annamalaisami ........................... H04L 65/1069 709/227
2015/0301864 A1   10/2015 Tseng et al.
2018/0285151 A1*  10/2018 Wang .................... G06F 9/5083

OTHER PUBLICATIONS

"Evaluation of multipath TCP load sharing with coupled congestion control option in heterogeneous networks", XP031940925, Aug. 4, 2011.
"Accurate branch prediction for short threads", XP058227360, Mar. 1, 2008.
European Search Report dated Oct. 12, 2018 issued in European Application No. 18172902.1.
Iqbal et al.; Flow Migration on Multicore Network Processors: Load Balancing While Minimizing Packet Reordering; 2013 42nd International Conference on Parallel Processing; XP 032534644; CPS; Dec. 18, 2013.
European Search Report dated Jun. 8, 2020; European Appln. No. 18 172 902.1-1215.

\* cited by examiner

METHOD AND APPARATUS FOR DATA PROCESSING BASED ON MULTICORE

CROSS-REFERENCE TO RELATED APPLICATION(S)

This application is based on and claims priority under 35 U.S.C. § 119(a) of a Korean patent application number 10-2017-0061214, filed on May 17, 2017, in the Korean Intellectual Property Office, and of a Korean patent application number 10-2017-0061263, filed on May 17, 2017, in the Korean Intellectual Property Office, the disclosure of each of which is incorporated by reference herein in its entirety.

BACKGROUND

1. Field

The disclosure relates to multicore-based data processing methods and apparatuses. More importantly, the disclosure relates to a method and an apparatus for enhancing traffic processing performance by accelerating data processing in a multicore system.

2. Description of Related Art

In order to meet the demand for wireless data traffic soaring since the fourth generation (4G) communication system came to the market, there are ongoing efforts to develop enhanced fifth generation (5G) communication systems or pre-5G communication systems. For the reasons, the 5G communication system or pre-5G communication system is called the beyond 4G network communication system or post long term evolution (LTE) system. For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation. There are also other various schemes under development for the 5G system including, e.g., hybrid frequency shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of things (IoT) network by which information is communicated and processed between things or other distributed components. Another arising technology is the Internet of everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC). In the IoT environment may be offered intelligent internet technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, M2M, MTC, or other 5G techniques are implemented by schemes, such as beamforming, MIMO, and array antenna schemes. The above-mentioned application of the cloud RAN as a Big data processing technique may be said to be an example of the convergence of the 5G and IoT technologies.

Meanwhile, there are increased needs for high-rate data processing as high-quality, high-volume multimedia content proliferates, such as ultra-high definition (UHD), virtual reality (VR), 360-degree videos, and the like. To meet such demand in mobile environments, next-generation 5G networks are evolving to Gbps grades. Further, recently increased applications for electronic devices, which require a high processing performance, led to electronic devices adopting multicore processors. As the wireless network environment and electronic devices evolve, content increases in quality and network data grows in volume.

To catch up and enhance user convenience, mobile devices are also adopting multicore processors. However, multicore does not work properly in high-rate network receive data processing. This is why mobile devices are not rich in flow number unlike servers or other similar systems requiring high-volume network traffic processing. Multicore systems come equipped with multiple cores, i.e., central processing unit (CPU) cores, to distribute and process in parallel data processing loads, enhancing traffic processing performance. Multicore systems distribute and process data through multiple connections, enabling high-rate data processing. With applications requiring high-rate processing performance increasing, multicore is also applied to mobile terminals, such as smartphones or tablet personal computers (PCs), for high-rate, high-volume data processing.

However, multicore systems generate a large quantity of data traffic only in some flows. Thus, if data processing concentrates on a particular core, data distribution by the multiple cores would not be efficient, and data processing may thus be delayed. Thus, the traffic processing performance may degrade.

Further, upon adopting the multicore technology for servers, mobile devices may consume more battery power due to their inefficient packet processing.

Thus, a need exists for building up a multicore environment for reducing power and another for properly allocating packets to the cores to properly handle high-volume traffic, such as online games or real-time video streaming as well as low-latency traffic, such as of voice over Internet Protocol (VoIP).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for efficiently distributing and processing data traffic in a multicore system.

Another aspect of the disclosure is to provide a method and an apparatus for enhancing traffic processing performance by accelerating data processing in a multicore system.

Another aspect of the disclosure is to provide a method and an apparatus for enhancing packet processing performance by allocating cores to handle received packets based on flow information received through a multicore electronic device.

Additional aspects will be set forth in part in the description which follows and, in part, will be apparent from the description, or may be learned by practice of the presented embodiments.

In accordance with an aspect of the disclosure, a method for processing data in a multicore system is provided. The method includes determining whether a condition for a first packet flow among one or more packet flows for data communication is met, if the condition is met, selecting cores to distribute packets of the first packet flow from among multiple cores, allocating packets received through the first packet flow to the selected cores, and operating the selected cores in parallel to process the packets allocated from the first packet flow.

The selected cores may include a first core and a second core. Upon operating the selected cores in parallel to process the packets allocated from the first packet flow, the first core and the second core may be configured to simultaneously process network layer processing on packets allocated to the first core and packets allocated to the second core.

The selected cores may include a first core and a second core configured to perform both network layer processing and transport layer packet processing. The second core may be configured to perform the network layer processing on a next packet while the first core performs the transport layer processing on a current packet.

Whether the condition is met may be determined based on one or more of a data reception speed of the first packet flow, context information about a history of the first packet flow, a packet throughput of a core to which the first packet flow is allocated, or a usage of the core.

The cores to which the packets of the first packet flow are to be distributed may be configured to be selected based on a packet throughput or usage of each core.

The method may further comprise generating and storing context information about a packet distribution history of the first packet flow.

Determining whether the condition of the first packet flow is met may be performed periodically, when a core whose usage is not less than a threshold among the plurality of cores occurs, or when a new packet flow is created.

The packets sequentially received may alternately be allocated to and processed by the selected cores. The selected cores may include a first core and a second core. Upon operating the selected cores in parallel to process the packets distributed and allocated from the first packet flow, the second core may be configured to start packet processing after the first core starts immediately prior packet processing.

The second core may be configured to start the packet processing a preset guard time after the first core starts the immediately prior packet processing. The guard time may be set to be less than a mean packet processing time of the second core.

The method may further comprise setting the selected cores to be prevented from adding other tasks than processing the packets distributed and allocated from the first packet flow or reallocating a second flow already allocated to at least any one of the selected cores to other cores than the selected cores.

In accordance with another aspect of the disclosure, a data processing device in a multicore system is provided. The data processing device includes a transceiver configured to receive packets through a first flow among one or more flows for data communication and a controller configured to determine whether a condition for the first packet flow is met, when the condition is met, select cores to distribute the packets of the first packet flow from among a plurality of CPU cores, and distribute and allocate the packets received through the first packet flow by the transceiver to the selected cores. The selected cores may be configured to operate in parallel to process the packets distributed and allocated from the first packet flow.

The selected cores may include a first core and a second core. The first core and the second core may be configured to simultaneously perform network layer processing on packets allocated to the first core and the second core.

The selected cores may include a first core and a second core configured to perform both network layer processing and transport layer packet processing. The second core may be configured to perform the network layer processing on a next packet while the first core performs the transport layer processing on a current packet.

Whether the condition is met may be determined based on one or more of a data reception speed of the first packet flow, context information about a packet distribution history of the first packet flow, a packet throughput of a core to which the first packet flow is allocated, or a usage of the core.

The cores to which the packets of the first packet flow are to be distributed may be configured to be selected based on a packet throughput or usage of each core.

The controller may be configured to generate and store context information about a packet distribution history of the first packet flow.

The controller may be configured to determine whether the condition of the first packet flow is met periodically, when a core whose usage is not less than a threshold among the plurality of cores occurs, or when a new packet flow is created.

Upon distributing the packets received through the first packet flow to the selected cores and processing the packets, the controller may be configured to alternately allocate the packets sequentially received to the selected cores and process the packets. The selected cores may include a first core and a second core. The second core may be configured to start packet processing after the first core starts immediately prior packet processing.

The second core may be configured to start the packet processing a preset guard time after the first core starts the immediately prior packet processing. The guard time may be set to be less than a mean packet processing time of the second core.

The controller may be configured to set the selected cores to be prevented from adding other tasks than processing the packets distributed from the first packet flow.

According to the disclosure, a method for allocating cores by an electronic device with multiple cores may comprise detecting an application running on the electronic device, identifying flow information about the detected application, and allocating a core to process packets generated through the detected application based on the flow information.

The flow information may include IP address information, port information, protocol information, or hash information about the flow.

Allocating the core may include determining whether the detected application belongs to a preset application group, and when the detected application belongs to the application group, allocating a preset first core as the core to process the packets generated through the detected application.

Unless the detected application belongs to the application group, the method may comprise identifying a core allocation history of the detected application and allocating the core to process the packets generated through the detected application based on the core allocation history.

When the detected application belongs to the application group, the method may comprise determining whether the amount of data of the packets generated through the detected application exceeds a preset threshold, when the amount of data of the packets generated through the detected application exceeds the preset threshold, allocating a preset second core as the core to process the packets generated through the detected application, and when the amount of data of the packets generated through the detected application is not more than the preset threshold, allocating the first core as the core to process the packets generated through the detected application.

The processible data amount of the second core may be larger than the processible data amount of the first core.

The application group may include an application that supports streaming services.

The method may further comprise processing packets through the allocated core and updating the core allocation history of the detected application based on a result of the packet processing.

In accordance with another aspect of the disclosure, an electronic device with multicore is provided. The electronic device includes a plurality of cores configured to process packets and a controller configured to detect an application running on the electronic device, identify flow information about the detected application, and allocate a core to process packets generated through the detected application based on the flow information.

The flow information may include IP address information, port information, protocol information, or hash information about the flow.

The controller may be configured to determine whether the detected application belongs to a preset application group, and when the detected application belongs to the application group, allocate a preset first core as the core to process the packets generated through the detected application.

Unless the detected application belongs to the application group, the controller may be configured to identify a core allocation history of the detected application and allocate the core to process the packets generated through the detected application based on the core allocation history.

When the detected application belongs to the application group, the controller may be configured to determine whether the amount of data of the packets generated through the detected application exceeds a preset threshold, when the amount of data of the packets generated through the detected application exceeds the preset threshold, allocate a preset second core as the core to process the packets generated through the detected application, and when the amount of data of the packets generated through the detected application is not more than the preset threshold, allocate the first core as the core to process the packets generated through the detected application.

The processible data amount of the second core may be larger than the processible data amount of the first core.

The application group may include an application that supports streaming services.

The controller may be configured to update the core allocation history of the detected application based on a result of the packet processing on the core.

According to the disclosure, a data processing method in a multicore system may comprise performing, by a first core, transport layer processing on a first packet among a plurality of packets including a TCP header and an IP header and performing, by a second core, network layer processing on a second packet while the first core performs the transport layer processing.

The method may further comprise moving, by a third core, the first packet on which the transport layer processing is performed by the first core to a buffer included in an application layer and stopping transport layer processing on a third packet, which is a packet next to the first packet, while the third core moves the transport layer processing-performed first packet.

Stopping the transport layer processing on the third packet which is the packet next to the first packet may include moving, by the first core, the third packet to a buffer where transport layer processing is performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
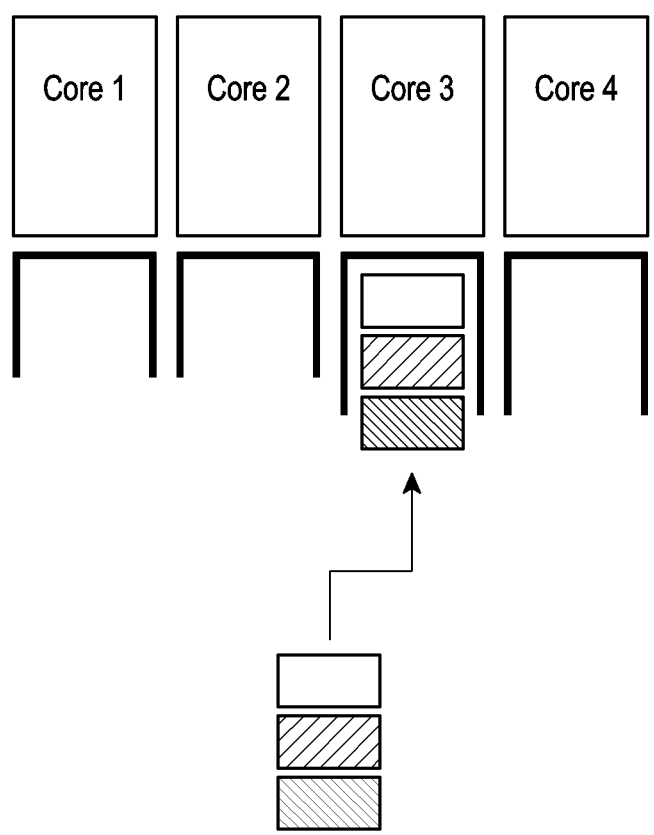
FIGS. 1A and 1B illustrate a core allocation method according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

When determined to make the subject matter of the disclosure unclear, the detailed of the known functions or configurations may be skipped.

Although the embodiments described below are separate from one another for ease of description, at least two or more of the embodiments may be combined together within such a range where they do not conflict one another.

The terms described below are defined considering the functions in embodiments of the disclosure and may be replaced with other terms according to the intention or practice of the user or operator. Therefore, the terms should be defined based on the overall disclosure.

Various changes may be made to embodiments of the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure. Some elements may be exaggerated or schematically shown. The size of each element does not necessarily reflect the real size of the element. The same reference numeral is used to refer to the same element throughout the drawings. The embodiments set forth herein are provided for thorough disclosure of the disclosure and making the category of the disclosure known to one of ordinary skill in the art, and the disclosure is defined only by the claims. The same reference numeral denotes the same element throughout the specification.

The terms coming with ordinal numbers, such as 'first' and 'second' may be used to denote various components, but the components are not limited by the terms. The terms are used only to distinguish one component from another. For example, a first component may be denoted a second component, and vice versa without departing from the scope of the disclosure. The term "and/or" may denote a combination(s) of a plurality of related items as listed or any of the items.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

An apparatus and method as proposed according to the disclosure may be applicable to various wireless and mobile communication systems, such as long-term evolution (LTE), LTE-advanced (LTE-A), fourth generation (4G) and fifth generation (5G) high speed downlink packet access (HSDPA), high speed uplink packet access (HSUPA), 3rd generation project partnership 2 (3GPP2) high rate packet data (HRPD), 3GPP2 wideband code division multiple access (WCDMA), 3GPP2 CDMA, institute of electrical and electronics engineers (IEEE) 802.16m, evolved packet system (EPS), and mobile Internet protocol (Mobile IP).

Further, the apparatuses and methods proposed herein may be applicable to wired communication systems or wireless/wired-integrated systems associated with the wireless and mobile communication systems, all IP-based communication systems or network components, e.g., network components over server-client connections, such as severs, clients, switches, (wireless/wired) routers, or access points (APs) between server and client, and all other such multicore systems performing IP-based communication (e.g., IPv4 or IPv6).

Generally, a communication system sets up a unique IP address, port number, or transport layer protocol, such as transmission control protocol (TCP) or user datagram protocol (UDP), for a server-client connection over a network. Data communication is carried out through each connection set up.

In the following description, a single connection for data communication is termed a "flow" or a "packet flow". As an example, "flow" or "packet flow" means a unique communication route set up with a particular IP address, port number, and transport layer protocol.

Now described are a method for allocating cores to a plurality of flows considering an application running on a multicore electronic device with reference to FIGS. 1A and 1B, 2, 3, 4, and 5 and a method for allocating a plurality of packets in one flow to cores with reference to FIGS. 6A and 6B, 7A and 7B, 8, 9A and 9B, 10A and 10B, 11A to 11C, 12, 13, 14A and 14B, and 15.

Figure 1B:
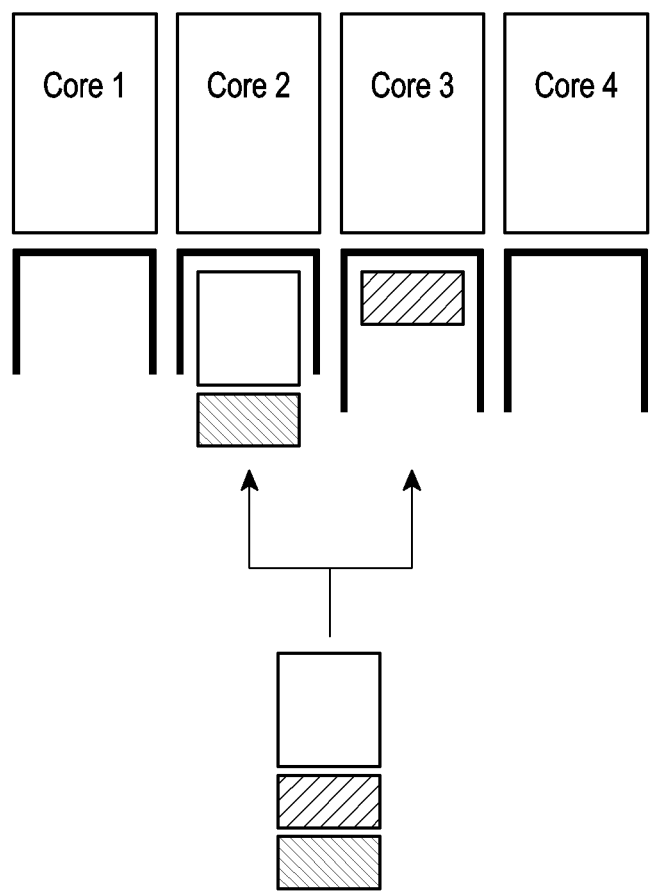

FIGS. 1A and 1B illustrate a core allocation method according to various embodiments of the disclosure.

Referring to FIG. 1A, a hash-based core allocation method is illustrated. The hash-based core allocation method means a method in which flows received through a network are differentiated from each other by hash values extracted from the flows, and core allocation is performed per flow.

Here, "flow" or "packet flow" means a TCP session, and in other words, a flow of multiple packets to operate a particular program or application. Accordingly, one "flow" or "packet flow" may include a plurality of packets, and each packet may include a different amount of data from another. For example, given that one flow or packet flow is a process for viewing a video on a particular application, the flow (or packet flow) may include three packets each of which may contain a different data amount from another.

Referring to FIG. 1A, the header of the first packet received may be parsed to generate a hash key, and the core mapped to the hash key may be determined to allocate the packet to the determined core.

In other words, following the hash-based core allocation method, core allocation is carried out sequentially or randomly based on the hash keys of packets received. Thus, such an event may arise where three packets are allocated to one core (core 3) as shown in FIG. 1A.

Although an example in which one flow contains three packets which have the same amount of data is described with reference to FIG. 1A, one flow may include a plurality of packets, and each packet may have a different data amount from another as set forth above.

Thus, in this case, an overhead may occur in core 3, causing a delay in processing the packets to which core 3 has been allocated.

Referring to FIG. 1B, a core allocation method according to an embodiment of the disclosure is illustrated. Here, an overhead is caused in the cores by allocating cores without considering the data amounts of the flows.

As described above, each flow may be constituted of a plurality of packets, and the packet number may differ from flow to flow. Accordingly, the data amount of each flow may also differ depending on the number of the packets in each flow.

For example, since the flow for transmitting or receiving text is not very complicated to process, the packets of the flow would not be many, and the data amount of the flow would also be small. Conversely, a streaming service flow, such as one for high-definition video call, would be large in data volume.

Among the multicore shown in FIG. 1B, cores 1 and 2 are cores with low data processability, and cores 3 and 4 are cores with high data processability. One of the flows received through the multicore may be verified to be larger in data volume than the other flows.

Hence, it would be preferable to allocate core 3 or core 4 for a larger data volume and core 1 or core 2 for a smaller data volume.

However, without considering the data processability of cores or the data volume of flows, the flow with a large data volume than the data processability of core 2 may be allocated to core 2 as shown in FIG. 1B. In other words, an overhead may occur in core 2, thus delaying processing the packets of the flows in the multicore.

There is thus proposed a method for identifying information about the packets of each flow through flow information received and properly processing the packets using the information.

Adopting the method may reduce current consumed by the cores. The method may be applicable to electronic devices, e.g., mobile devices sensitive to current consumption.

Figure 2:
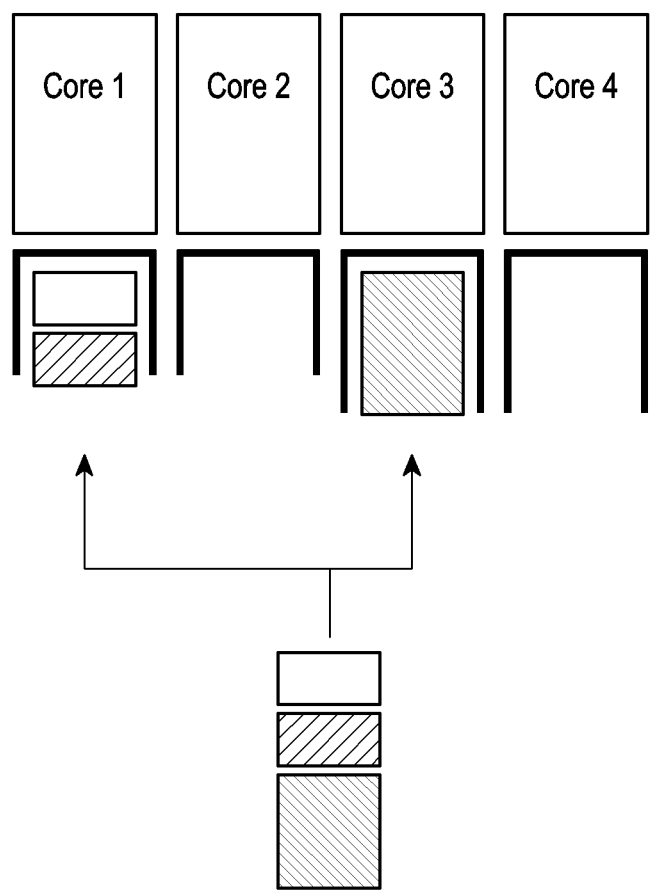
FIG. 2 illustrates allocation of packets to multicore according to an embodiment of the disclosure.

FIG. 2 illustrates allocation of packets to multicore according to an embodiment of the disclosure.

Referring to FIG. 2, three flows in total are illustrated among which the last flow received is verified to be larger in data volume than the other flows.

For example, in terms of the foregoing examples, the first flow received (a flow smaller in data volume) may be a flow related to a text service, the second flow received (a flow smaller in data volume) may be a flow related to a weather information application, and the last flow received (a flow larger in data volume) may be a flow related to a video service.

In this case, the first-received flow and the second-received flow, since they are not large in data volume, both may be allocated to core 1. As illustrated in FIG. 2, since the processible data amount of core 1 is larger than the sum of the data amount of the first-received flow and the data amount of the second-received flow, letting core 1 process the two flows is preferable in light of the current consumption of the multicore.

Although FIG. 2 illustrates an example of allocating core 1 as a core to process the first-received flow and the second-received flow, it can also be possible to allocate core 2, which has the same processible data amount as core 1, as the flow processing core.

Meanwhile, from a point of view of processible data amount, core 3 and core 4 may be allocated as the cores to process the first-received flow and the second-received flow.

However, core 3 and core 4, although being capable of processing more data than core 1 and core 2 can, consume more current. In this case, thus, it is preferable to allocate core 1 or core 2, rather than core 3 or core 4, as a core to process the first flow and the second flow.

In contrast, the third flow is large in data volume unlike the first flow and the second flow. Specifically, the third flow may have a larger data volume than the processible data amount of core 1 or core 2.

In this case, since allocating the third flow to core 1 or core 2 causes an overhead in the multicore, it would be preferable to allocate core 3 or core 4 as a core to process the third flow. FIG. 2 illustrates an example in which core 3 is allocated as a core to process the third flow.

In other words, according to the core allocation method disclosed in FIG. 2, core allocation can be done fitting the data amount of each flow, and packet processing for cores with high current consumption may be minimized, thereby minimizing current consumption on the multicore operation.

Meanwhile, although FIG. 2 illustrates a big.little-type multicore configuration, the scope of the disclosure is not limited thereto. The disclosure may be applicable to various types of multicore configurations.

Figure 3:
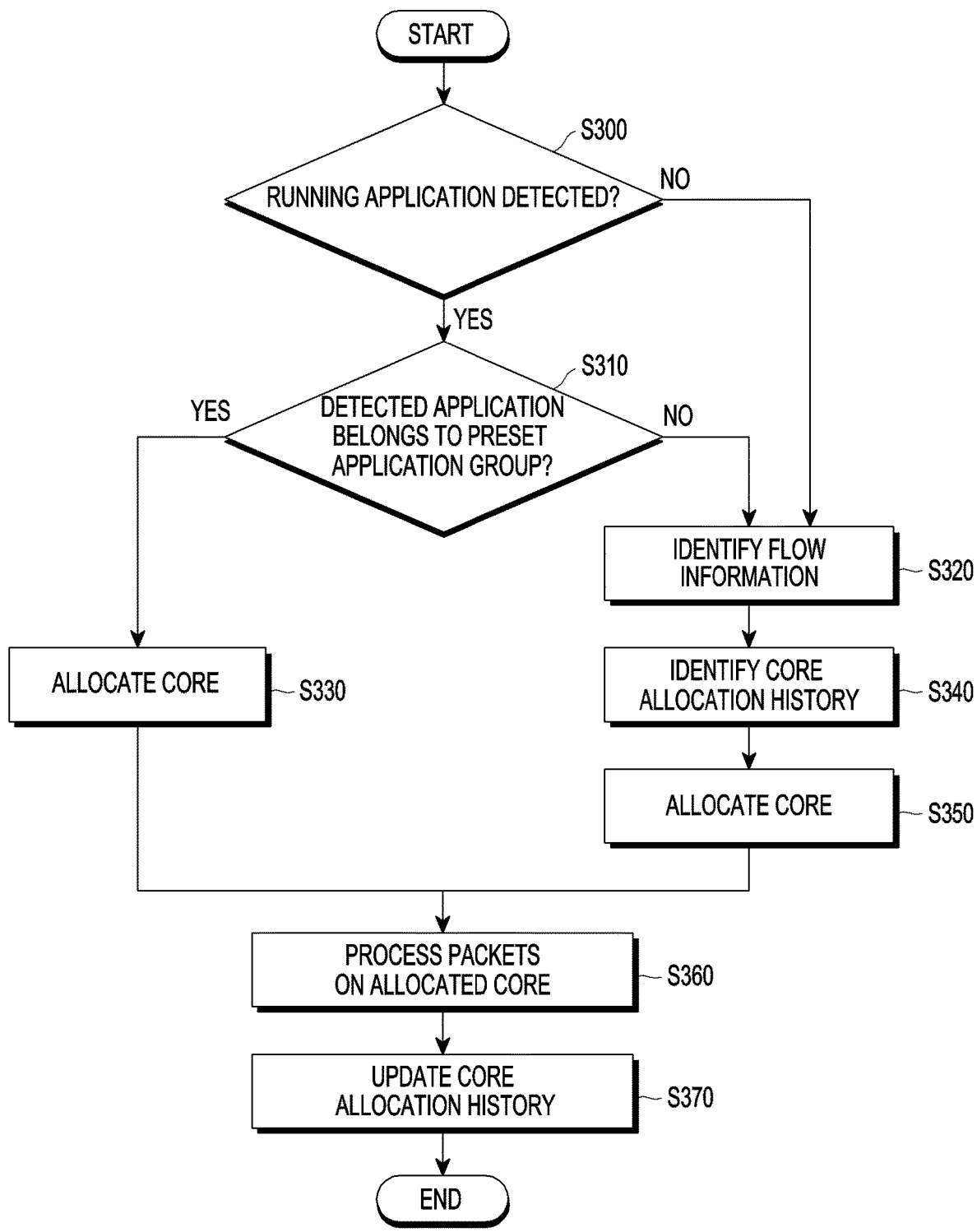
FIG. 3 is a flowchart illustrating a method for allocating cores in a multicore electronic device according to an embodiment of the disclosure.

Specifically, described below with reference to FIG. 3 is what process a core allocation method is performed in according to the disclosure.

FIG. 3 is a flowchart illustrating a method for allocating cores in a multicore electronic device according to an embodiment of the disclosure.

Referring to FIG. 3, in operation S300, a controller may detect running an application. By the operation, the controller may predict that a flow will be generated by running the application and may thus prepare for allocating a core to process the packets.

In operation S310, the controller determines whether the detected application is a preset application or belongs to a preset application group.

Here, the preset application or application group means an application(s) highly likely to generate a flow with a larger data volume. For example, an application supporting a streaming service may be included in the application group.

The application group may be classified into a plurality of groups, each of which may have a priority. For example, the application group may be divided into a first group with a first priority, a second group with a second priority, and a third group with a third priority. The reason for so classifying the group is to segmenting packet-core allocation. The controller may allocate the cores according to the priorities of the groups.

For example, an application supporting a real-time voice service may belong to the first group, an application supporting a real-time video service may belong to the second group, and an application supporting a real-time social network service (SNS) may belong to the third group.

In this case, when the real-time voice service-supportive application, the real-time video service-supportive application, and the real-time SNS-supportive application simultaneously run, the controller may allocate the cores according to the identified priorities of the applications. In other words, packets related to the real-time voice service-supportive application may first be allocated to a separate core.

Although an example of a method for determining an application group is set forth herein, the scope of the disclosure is not limited thereto but may rather reach any modifications made thereto by one of ordinary skill in the art.

When the detected application belongs to the preset application group in operation S310, the data volume of the flow received by the multicore would likely be high. Thus, in this case, the controller may allocate a first core or a second core, as a core to process the packets of the flow in operation S330.

This is described below with reference to FIG. 4. An example in which the application detected in operation S310 does not belong to the preset application group is first described.

When the detected application does not belong to the preset application group, the data volume of the flow is highly likely to be small. Thus, in this case, the controller identifies flow information in operation S320. The flow information may include IP address information, port information, protocol information, or hash information about the flow.

The electronic device may simultaneously run a plurality of applications. The controller may simultaneously identify a plurality of pieces of flow information in operation S320.

For example, when a music application runs simultaneously with a game application, the controller may identify flow information about the music application and flow information about the game application in operation S310.

Upon identifying the flow information in operation S320, the controller may identify a core allocation history for the detected application in operation S340.

The core allocation history means core information previously allocated to process the application packets. The core allocation history may be stored inside the controller or in a server provided separately from the controller.

Upon identifying the core allocation history of the detected application in operation S340, the controller allocates a core to process packets, which are generated through the detected application, based on the core allocation history in operation S350.

For example, where the core allocation history of a stock information application is core 2, the controller may allocate core 2 as the core to process the packets of the stock information application in operation S350.

After allocating the core to process packets in operation S330 or S350, packets received by the multicore are distributed and processed by the cores allocated therefor in operation S360.

Thereafter, the controller may update the core allocation history of the detected application based on a result of the packet processing in operation S370. In the foregoing example, when the stock information application packets are allocated to and processed by core 2, the controller may update the core allocation history to indicate that the stock information application has been allocated twice and processed by core 2.

Meanwhile, when the stock information application is allocated to and processed by core 1 due to the overhead of core 2, the controller may update the core allocation history to indicate that the stock information application has been allocated and processed once by core 1 and once by core 2.

In this case, upon identifying the core allocation history of the stock information application in operation S340, competition may occur when the controller allocates the cores because core 1 and core 2 each have been allocated to process once. Thus, what may be considered in this case is a method of allocating the cores based on the latest updated core allocation history.

In contrast, such an event may arise where a flow is generated even without detecting a running of the application in operation S300. In this case, since there is no application information, the controller cannot perform operation S310.

Accordingly, in this case, the controller may identify flow information through operation S320, identify the core allocation history through operation S340, and allocate the cores based on the identified core allocation history in operation S350.

Figure 4:
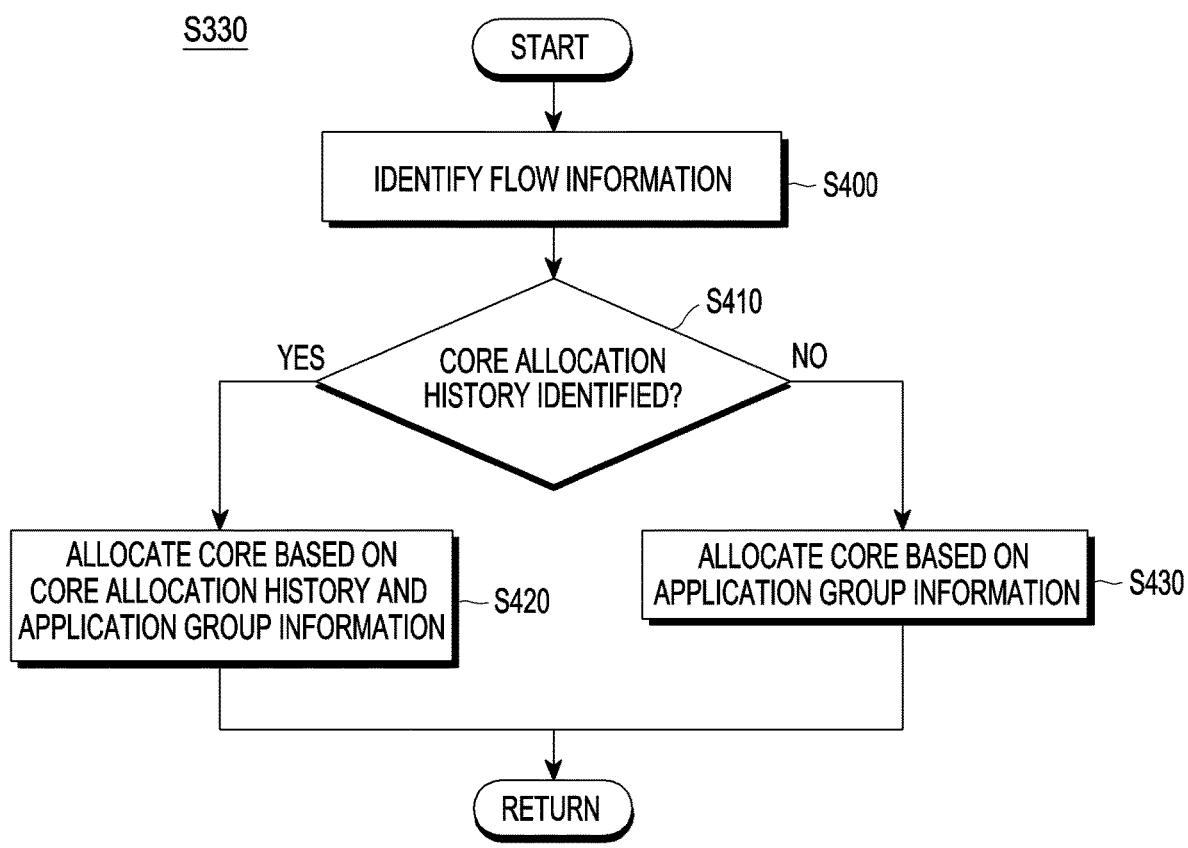
FIG. 4 is a flowchart illustrating a core allocation method when a sensed application belongs to a preset application group according to an embodiment of the disclosure.

FIG. 4 is a flowchart illustrating a core allocation method when a sensed application belongs to a preset application group according to an embodiment of the disclosure.

Referring to FIG. 4, as set forth above, the "detected application belongs to the preset application group" means that the detected application is an application with a high data volume, such as a game application or a real-time voice application. Thus, in this case, the controller identifies the flow information about the detected application in operation S400. Operation S400 is similar to the above-described flow information identification information S320, and no detailed description thereof is given below.

Upon identifying the flow information in operation S400, the controller may identify a core allocation history for the detected application in operation S410. Operation S410 is similar to operation S340 described above, and no detailed description thereof is given below.

Upon identifying the core allocation history of the detected application in operation S410, the controller allocates a core to process the packets of the detected application based on the identified core allocation history and information about the detected application group in operation S420.

Conversely, upon failing to identify the core allocation history in operation S410, the controller allocates the core to process the packets based on the information about the detected application group in operation S430.

When the core to process the packets is allocated in operation S420 or S430, the controller ends operation S330 and returns to operation S360 to process the packets with the allocated core.

Meanwhile, according to the disclosure, core allocation can be achieved based on the data volume of the flow and the processible data amount of the core.

Specifically, the controller may determine whether the data volume of the flow generated through the detected application exceeds a preset threshold. The reason why the controller compares the data volume of the flow with the preset threshold is that the multicore may differ in processible data amount from each other.

Multicore used for electronic devices or mobile devices may be configured to have the same performance or may also be configured in a big.little-type multicore. The big.little-type multicore may be configured with a less data-processible core(s) (little core(s)) and a more data-processible core(s) (big core(s)).

The less data processible core, although causing overhead therein because it cannot process much data once, consumes less current than the more data processible cores, making it more preferable in processing packets in light of heat and battery power consumption.

Thus, according to the disclosure, the controller compares the data volume of the flow generated through the detected application with the preset threshold and allocates the core to process the packets generated through the detected application based on a result of the comparison. Hence, the preset threshold may be the maximum processible data amount of the lower data processible core.

When the data volume of the packets generated through the detected application exceeds the preset threshold, packet processing through the lower data processible core is impossible. Thus, the controller allocates the more data processible core as the core to process the packets.

Conversely, when the data volume of the packets generated through the detected application is the preset threshold or less, the lower data processible core is enough to process packets. Thus, the controller allocates the less data processible core as the core to process the packets.

Figure 5:
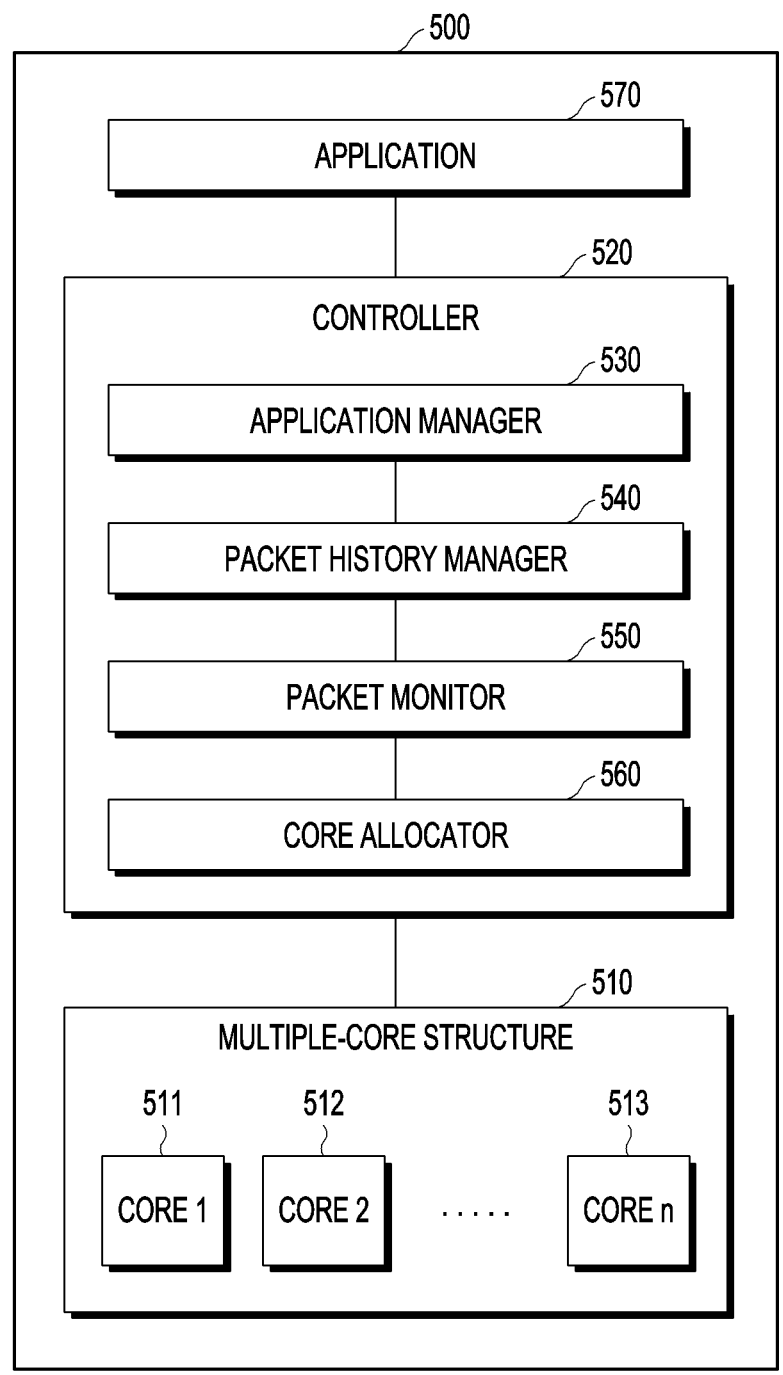
FIG. 5 illustrates a configuration of an electronic device according to an embodiment of the disclosure.

FIG. 5 illustrates a configuration of an electronic device according to an embodiment of the disclosure.

Referring to FIG. 5, according to the disclosure, an electronic device 500 may include an application 570, a controller 520, and a multicore 510.

Referring to FIG. 5, the multicore 510 may include n cores and may be configured in a big.little type. For example, core 1 511 and core 2 512 may be lower data processible cores, e.g., little-type cores, and core n 513 may be a more data processible core, e.g., a big-type core.

According to the disclosure, the controller 520 may perform various operations, such as detecting a running of the application 570, allocating received packets to the cores, and managing the cores' packet processing history. The controller 520 may be a hardware component, such as a processor, or a software component, such as an operating system (OS).

Specifically, according to the disclosure, the controller 520 may include an application manager 530, a packet history manager 540, a packet monitor 550, and a core allocator 560.

The application manager 530 detects the application 570 that runs on the foreground of the electronic device 500. Upon detecting the running of the application 570, the application manager 530 may analyze the category of the application 570, and upon identifying application information including category information, the application manager 530 may deliver the application information to the packet history manager 540, the packet monitor 550, and the core allocator 560.

The packet history manager 540 may be a device to manage a past packet processing history. The packet history manager 540 may record the past history of packet allocation and processing and manage core allocation, traffic, and application information.

The packet monitor 550 may monitor flows transmitted/received through the electronic device 500. The packet monitor 550 may identify flow information to be received based on the application information received from the application manager 530 and predict a flow and packet to be received. The packet monitor 550 may identify flows and packets received and transfer information about the received flows and packet information to the core allocator 560.

The packet monitor 550 may monitor traffic of the received flows and monitor whether the data amount of packets received exceeds the processible data amount of the allocated core.

Where the data amount of received packets exceeds the processible data amount of the allocated core, the packet monitor 550 may transfer information thereabout to the core allocator 560, allowing other cores to process the received packets.

The core allocator 560 may predict packets to be received by the multicore 510 based on the flow information received from the packet monitor 550 and the application information received from the application manager 530 and allocate a core to process the packets.

The core allocator 560 may also predict packets to be received by the multicore 510 based on the core allocation history received from the packet history manager 540 and allocate a core to process the packets.

Where the data amount of the received packets exceeds the processible data amount of the allocated core, the core allocator 560 may allocate a different core as the core to process the packets, and after the core allocation, the core allocator 560 may transmit the core allocation information and packet information to the packet history manager 540. A method for allocating a plurality of packets included in one flow to cores is described below with reference to FIGS. 6A to 15.

Figure 6A:
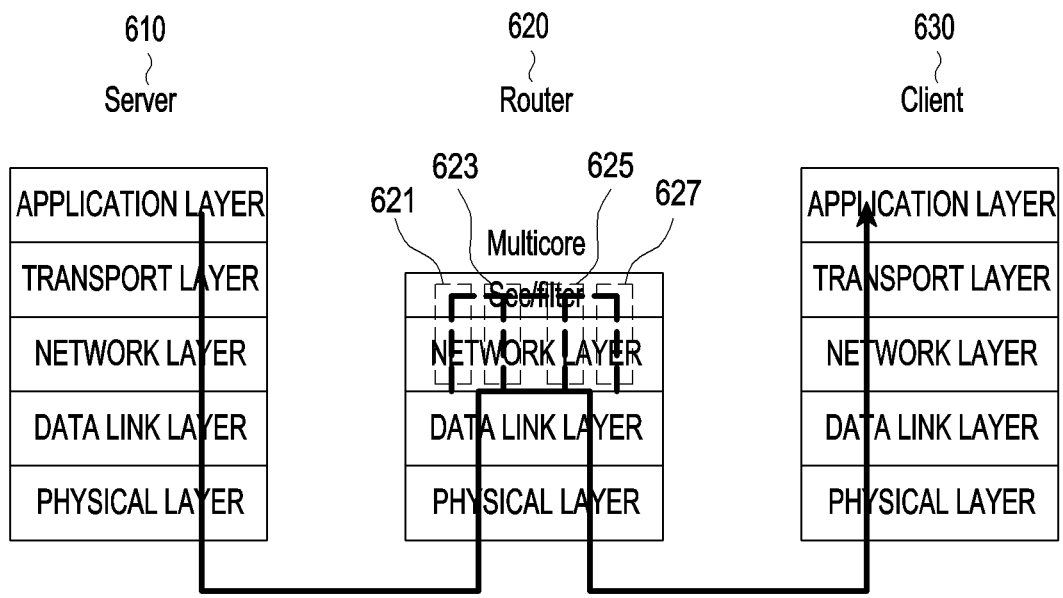
FIGS. 6A and 6B illustrate a multicore router and a multicore client according to various embodiments of the disclosure.
Figure 6B:
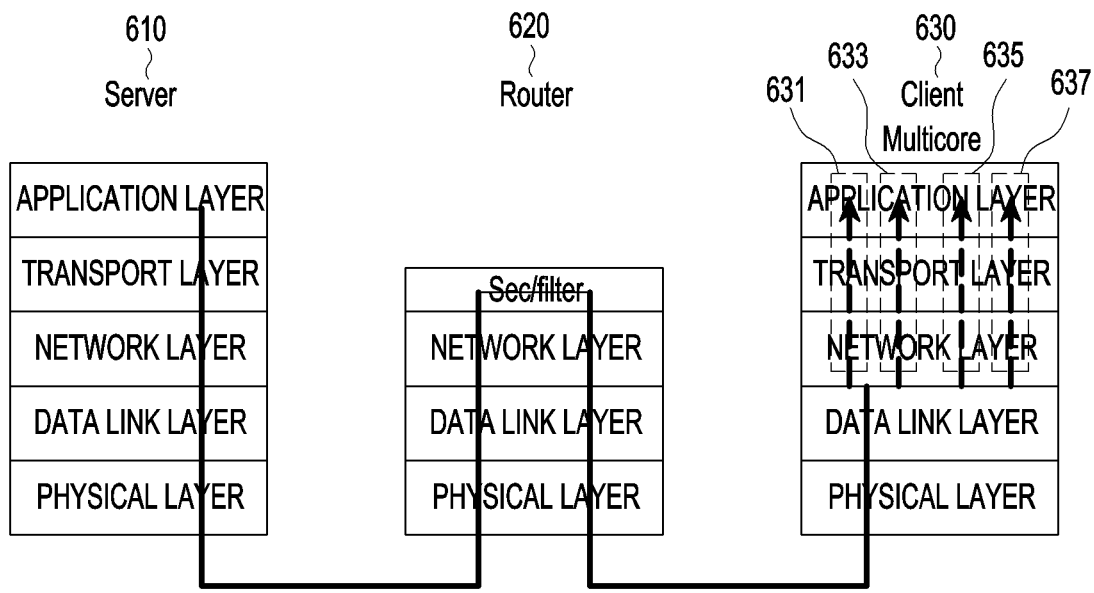

FIGS. 6A and 6B illustrate a multicore router and a multicore client according to various embodiments of the disclosure.

Referring to FIGS. 6A and 6B, a data transmission route from a server 610 through a router 620 to a client 630 is illustrated. FIG. 6A illustrates effects that the multicore router 620 has, and FIG. 6B illustrates effects that the multicore client 630 has. The effects by the multicore router 620 and the multicore client 630 are now described together to compare them. Typically, distributive packet processing may be performed by the server 610 or the router 620. An embodiment relates to a distributive packet processing method between the multicore client 630 and a plurality of cores.

Data produced from the application layer (APP layer) of the server 610 goes through the transport layer (TCP layer), the network layer (IP layer), the data link layer (MAC layer), and the physical layer (PHY layer) while being encapsulated by a recognizable header in each layer (this process is called "encapsulation.").

More particularly, the data may be converted in the transport layer into a TCP packet (TCP header-added data) easy to deliver on the internet and may be converted in the network layer into a TCP/IP packet (an IP header-added TCP packet) to be able to go to a particular address on the internet.

After the encapsulation, the data may undergo de-encapsulation through the PHY layer, data link layer, network layer, and transport layer. The data that has been de-encapsulated may then be processed by the core included in the application layer of the client 630. Finally, the data processed by the core included in the application layer may be provided to the user in a particular service.

According to an embodiment of the disclosure, the client 630 may be an electronic device including multicore and may be called a multicore system (e.g., a terminal, smartphone, tablet personal computer (PC), or a similar mobile terminal or a home wired/wireless router). According to an embodiment of the disclosure, where the client 630 is a terminal, the client 630 may receive encapsulated data from a base station (not shown).

The router 620 may transfer the TCP/IP packet contained in the encapsulated data to a particular address on the internet. The router 620 may analyze the TCP/IP packet in the encapsulated data to determine the route of the encapsulated data and may transfer the encapsulated data to the client 620 along the determined route.

Referring to FIG. 6A, the router 620 may include multicore 621, 623, 625, and 627. The amount of TCP/IP packets analyzed by the router 620 including the multicore 621, 623, 625, and 627 may be larger than the amount of TCP/IP packets analyzed by a single-core router. The multicore router 620 may analyze the route of more encapsulated data and transfer more encapsulated data to the client 630 that a single-core router does. Resultantly, the multicore router 620 may enhance the performance of routing TCP/IP packets.

Referring to FIG. 6B, according to an embodiment of the disclosure, the client 630 may include multicore 631, 633, 635, and 637. As compared with the router 620 having multiple the cores 621, 623, 625, and 627, the client 630 having the multicore 631, 633, 635, and 637 may enhance the throughput of end-to-end received packets. According to an embodiment of the disclosure, the throughput may be calculated as the amount of packets processed per unit time by the client 630.

According to an embodiment of the disclosure, the multicore client 630 may further include a memory to store TCP/IP packets to further enhance the throughput of received packets. According to an embodiment of the disclosure, the memory may be a memory having a stack structure. Alternatively, the memory may be a memory with a queue structure.

According to an embodiment of the disclosure, the number of memories to store TCP/IP packets may corresponding to the number of the cores in the client 630. For example, where there are two cores to process TCP/IP packets, two memories may be provided to store TCP/IP packets. However, the number of memories is not necessarily limited to the number of cores. For example, the controller 630 may further include a memory (e.g., a backup queue) that the core processing data in the application layer is to use. The multicore-based data processing scheme described below in connection with FIGS. 7A and 7B may be performed by a multicore client (e.g., the multicore client 630) which may also be referred to as a "multicore system."

Meanwhile, the multicore system may come in two types. A first multicore system may include a plurality of cores each of which may be assigned one flow. For example, the first multicore system may include a first core to process a first flow and a second core to process a second flow. In other words, the first multicore system may allocate the first flow only to the first core and process the flow.

According to an embodiment of the disclosure, the first multicore system may allocate a particular flow to a particular one of the multicore considering the application driven thereon. According to an embodiment of the disclosure, the first multicore system may allocate a particular flow to a particular core per application given the history information (e.g., network traffic, packet IP addresses, and information about the server producing the flows) about the application previously driven and history information (e.g., core identification information or core usage) about the core previously assigned a flow. For example, the first multicore system may allocate the flow of a first application (i.e., packets related to the first application) to the first core to process the flow of the first application and the flow of a second application (e.g., packets related to the second application) to the second core to process the flow of the second application.

The second multicore system may allocate a first packet and a second packet which are included in one flow to a first core and a second core, respectively, processing the flow. The multicore system described below may be a system that allocates a plurality of cores to one flow as does the second multicore system.

According to an embodiment of the disclosure, the multicore may be divided into cores that consume more power but exhibits a high processing performance—hereinafter, referred to as "big-type cores"—and cores that consume less power and have a low processing performance—hereinafter, referred to as "little-type cores," depending on traffic processing performances. The multicore system may allocate a plurality of packets in one flow to the cores having the same traffic processing performance. This is why the order of the packets is of significance because the packets included in one flow are allocated.

For example, the multicore system may include a first core and a third core, which are classified as big-type cores, and a second core and a fourth core, which are classified as little-type cores. Upon allocating the first packet to the first core, the multicore system may allocate the second packet to the third core, which is a big-type core, but not to the second core, which is a little-type core. Thus, the end time of the processing of the first packet may be similar to the end time of the processing of the second packet. Thus, the first packet and the second packet may remain in order. When the first packet is allocated to the second core while the second packet is allocated to the first core, the end time of the processing of the second packet may come earlier than the end time of the processing of the first packet, resulting in the first packet and the second packet being out of order.

Figure 7A:
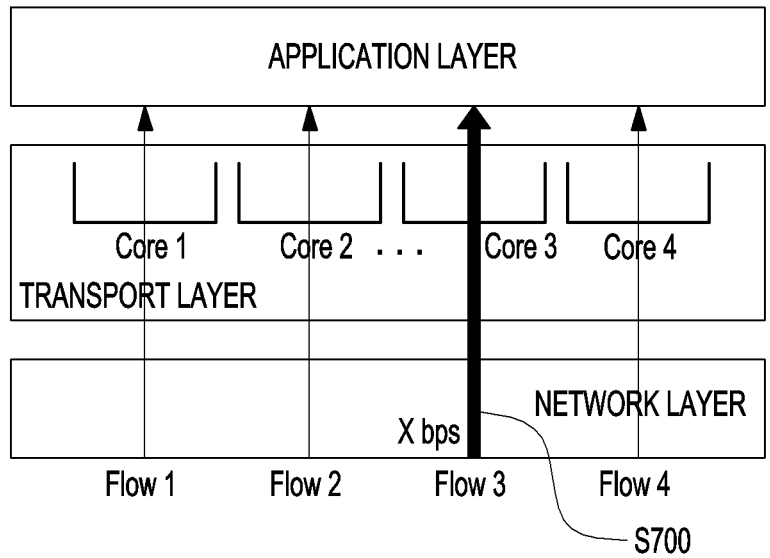
FIGS. 7A and 7B illustrate a multicore-based data processing scheme according to various embodiments of the disclosure.
Figure 7B:
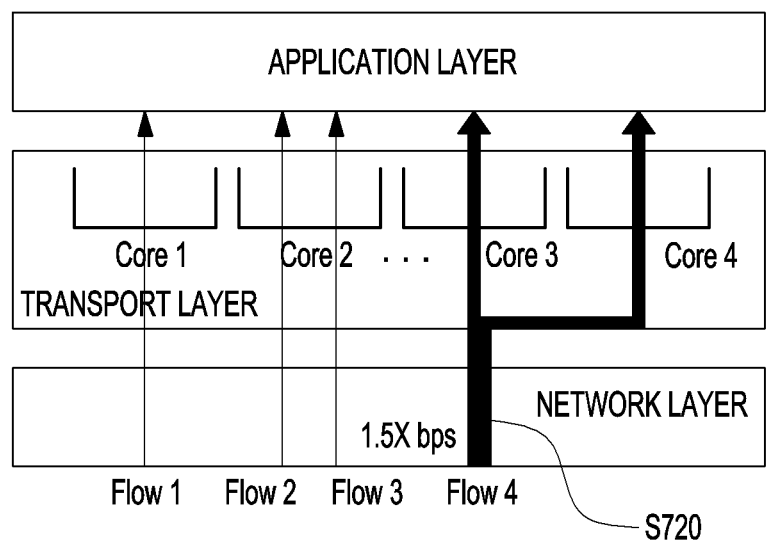

FIGS. 7A and 7B illustrate a multicore-based data processing scheme according to various embodiments of the disclosure.

FIG. 7A illustrates multicore-based data processing for comparison with FIG. 7B.

Referring to FIG. 7A, upon receiving data through a plurality of flows (Flows 1 to 4), a multicore system extracts hash values from header information of packets transmitted through the flows to differentiate the flows. The multicore system allocates each flow to one of the cores (Cores 1 to 4) of the multicore system, distributing and processing packets per flow. The packet header information may contain the source IP address, source port, destination IP address, destination port, and transport layer protocol.

Such distributed packet processing is termed receive packet steering (RPS).

RPS enables a simultaneous processing of packets produced from a plurality of flows (Flows 1 to 4) using several cores (Cores 1 to 4), making it suitable for high-rate, high-volume data processing.

A multicore system may set up a core set for RPS among all its equipped cores and may designate which one it is to use among the cores of the core set using the markable value assigned to each flow. Data transmitted through a particular flow is assigned to one of designated cores according to the markable value of the flow. The markable value may be set per network interface.

Upon receipt of packets through one flow, the network driver of the multicore system sends an instruction (interrupt) to a default core processing received packets. Upon receiving the instruction, the default core extracts the hash value of the flow. One of the cores belonging to the core set is designated as a core for the flow based on the extracted hash value. The default core delivers per-flow received packets to the backlog queue of the designated core and sends an instruction (interrupt) to enable the core to process packets.

As such, RPS performs distributed processing on packets in units of flows. In other words, a core to process a packet transmitted through each flow is designated according to the hash value in the header information of the packet, and the designated core processes all the packets in the flow.

In this case, multicore systems that generate many flows at the same time and have similar data traffic per flow—e.g., servers—may evenly distribute per-core loads (packet processing loads) in an easier way. However, other multicore systems, such as smartphones, tablet PCs, other mobile terminals, or home wired/wireless routers, in which flows simultaneously connected are not many or per-flow data traffic significantly differs, may not properly perform distributed packet processing. Where high-volume data traffic occurs in some flows, although many flows are generated, data processing load concentrates only at a particular core, and thus, traffic processing performance may degrade. For example, where a mobile terminal downloads a high-volume video file, one flow (e.g., one TCP connection) may be created, and the load of processing packets received through the flow may concentrate at one core.

Upon randomly distribute data traffic based on hash values, computation using a hash function is performed followed by modular computation (e.g., mod 2, mod 4, . . . after the hash function is applied to N data packets). In this case, if the number of samples (i.e., the number of flows) is sufficient, traffic may be nearly evenly distributed, albeit randomly. However, if samples are not enough (i.e., the number of flows is small), more flows may be allocated to one core than the others, causing data traffic to be highly likely to concentrate at the core.

As such, when high-volume data traffic concentrates in a particular flow under the fewer flow circumstance, enhancing traffic processing performance is limiting.

Further, although a number of flows (e.g., Flows 1 to 4 of FIG. 7A) are created and uniformly divided to evenly distribute the packet processing loads of the cores (Cores 1 to 4), if data traffic (packet amount) concentrates in one flow (Flow 3) (S700), the load of the core (Core 3) designated for processing the packets of the flow are only significantly increased, thus lowering traffic processing performance.

FIG. 7B illustrates multicore-based data processing according to an embodiment of the disclosure.

Referring to FIG. 7B, as set forth above, where the number of flows simultaneously connected is not many in a multicore system, and various traffic is created from each flow or a data traffic difference from flow to flow is significant, concentration of high-volume data traffic at some flows, although many flows are created, occurs oftentimes. Accordingly, where cores are simply designated in units of flows, that is, when flows are randomly allocated to one of the cores, loads concentrate at some cores, deteriorating traffic processing performance. More particularly, where high-rate, high-volume data reception occurs in a certain flow (e.g., Flow 3), one core (e.g., Core 3) processes (S700) the entire data traffic of the flow, resulting in a failure to secure a sufficient data reception speed.

According to an embodiment of the disclosure, such issues are address as follows. Where high-rate, high-volume data processing is required for a particular flow (e.g., Flow 4 of FIG. 7B), the packets of the flow are distributed to a plurality of cores (e.g., Cores 3 and 4 of FIG. 7B). Thus, the packets of one flow (e.g., Flow 4 of FIG. 7B) may simultaneously be processed by two or more cores (e.g., Cores 3 and 4 of FIG. 7B) (S720), accelerating data processing and hence enhancing traffic processing performance.

In other words, the distributed packet processing technique according to an embodiment may be a scheme to allow data traffic to be distributed to and processed by multicore, and this technique is hereinafter referred to as "flow scattering (FS)."

Always applying FS to all flows so that the data traffic of the flows is processed in packet units by multicore may worsen the packet out-of-order issue, causing traffic processing performance to rather deteriorate.

Thus, there are proposed herein a scheme for efficiently applying FS (e.g., only to a particular flow in a particular circumstance) and a scheme for selecting an (optimal) core for use upon applying FS.

Figure 8:
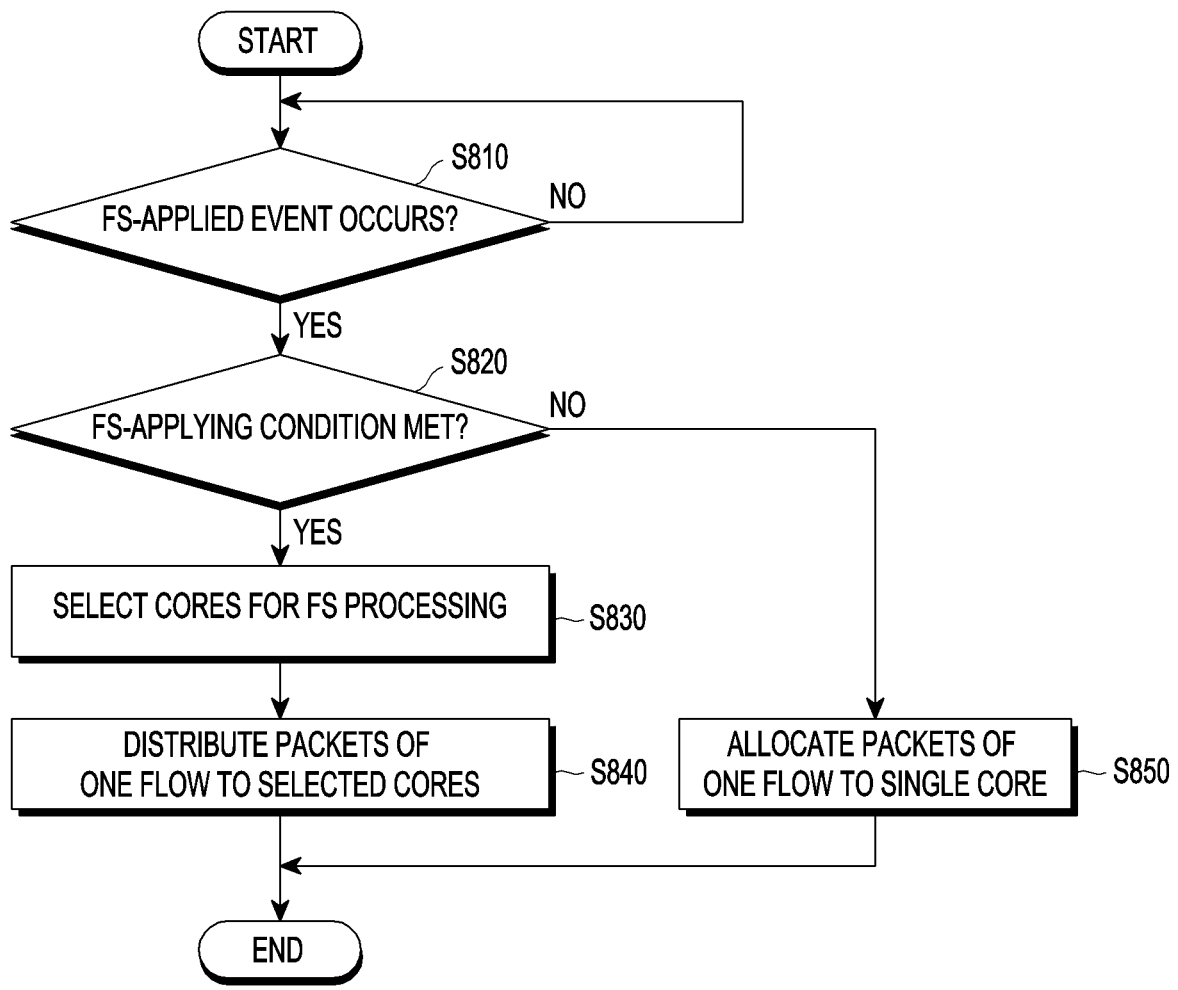
FIG. 8 is a flowchart illustrating a multicore-based data processing method according to an embodiment of the disclosure.

FIG. 8 is a flowchart illustrating a multicore-based data processing method according to an embodiment of the disclosure.

In the following description, the term "device" means an entity equipped with multicore and configured to be able to receive and process data and is provided solely for illustration purposes without limiting the scope of the disclosure.

For example, methods disclosed herein may be executed by mobile terminals, such as smartphones or tablet PCs, servers or clients, switches, routers, or other wired/wireless user terminals positioned between servers and clients, networks, communication systems, or any other devices or systems, or some hardware/firmware/software processors or controllers of the devices or systems. Alternatively, the methods may be implemented in the form of some functions, components, or modules included in the kernel.

Referring to FIG. 8, in operation S810, the device checks whether a predetermined period arrives or a particular event occurs where it is needed to determine whether to apply FS. For example, where a core has a load not less than a threshold or a new flow is created (connected), the device may recognize that the particular event where it is needed to determine whether to apply FS has happened.

Periodically or when a particular event occurs (e.g., where there is a core whose load is not less than the threshold or where a new flow is created), the device determines whether FS is applicable to one flow, i.e., whether a packet distribution condition for the flow is met at operation S820.

As an example, where a core whose load is not less than the threshold occurs, the device determines whether the packet distribution condition for the flow previously allocated to the core is met. Alternatively, when a predetermined period arrives, the device may determine whether the packet distribution condition of the flow(s) being used is met. Alternatively, when a new flow is created, the device may determine whether the packet distribution condition for the created flow is met.

Whether a particular flow meets the packet distribution condition may be determined based on one or more of the data reception speed of the flow, context information about the packet distribution history for the flow, the packet throughput of the core assigned the flow, and the usage of the core.

Conditions to apply FS to a particular flow, i.e., packet distribution conditions, are described below.

A) Is there context information about the packet distribution history of one flow and is the context met?

B) Is the packet throughput of a particular core not less than a predetermined threshold #1 [%]?—For example, where the peak usage of 95% or the mean usage of 80% is designated as threshold #1, and the peak usage of a particular core is 95% or more or the mean usage is 80%, it may be determined to be not less than threshold #1.

C) Is the data amount of the flow creating the maximum data amount (throughput or data reception speed) in the core corresponding to condition B or the data amount of the flow creating the maximum data amount among all the flows less than a predetermined threshold #2 [Mbps]?—For example, threshold #2 may be set to the maximum data reception speed [Mbps] that may be obtained at a usage of 50% at the maximum clock speed (frequency) of the current core.

D) Is the time meeting condition B and/or condition C less than a predetermined threshold #3 [sec]?—For example, only when the time meeting conditions B and C exceeds 1 sec, FS may apply.

E) Is there a core whose usage is less than a predetermined threshold #4[%] among the other cores than the core corresponding to condition B? Alternatively, is there a core that exhibits a usage difference from the core corresponding to condition B (the core having the maximum usage) by a predetermined value?—For example, where there is a core that exhibits a usage difference from the core corresponding to condition B by 50% or more or less than 20%, the core may be chosen as a core for FS processing.

According to an embodiment of the disclosure, even when only some of the above-listed conditions A to E are met, FS may apply.

Upon determining in operation S820 that the packet distribution conditions for one flow are met, the device selects a plurality of cores for FS processing among all the cores and creates an FS table from flow information about the flow and the core information about the selected cores at operation S830.

Thereafter, where the data reception speed of the FS-applied flow becomes less than a predetermined threshold #5 [Mbps] or such state lasts for a predetermined time [e.g., 1 sec or more], the flow may be removed from the FS table. In this case, applying FS to the flow stops.

In operation S830, the device may create and store context information about the flow, together with the information about the FS-applied flow and the core information about the selected cores for FS processing, in a flow database (DB). By so doing, when a need comes up in the future (e.g., when a new flow is created) or when there used to be a history of having applied FS in the same flow and/or the same context from the flow DB, FS may immediately be applied based on the history.

Examples of the stored context information are as follows.

Flow information, server IP address, port number, transport layer protocol (e.g., TCP or UDP)

Application information, user name (user identification (ID) or UID), whether background or foreground Device status, screen on/off, network connection (e.g., wireless fidelity (Wi-Fi) or LTE), battery status (%), position, mobility In operation S830, the device may monitor the core information, e.g., the packet throughput or individual usage information about all the equipped cores, select cores for FS processing on the flow based on a result of the monitoring, and store in the FS table.

As an example, the device may select, as cores for FS processing, cores whose core usages for packet processing are less than a predetermined threshold (e.g., 20%). Alternatively, the device may choose, as cores for FS processing, cores whose usages are less than a predetermined threshold or differ from the core with the maximum usage by a predetermined value (e.g., 50%) or more. Alternatively, the device may select, as cores for FS processing, cores whose usages are less than a predetermined threshold or differ from the core with the maximum usage by a predetermined value or more among the standby cores with no flow allocation or among the cores with allocations of flows that are not ones for FS processing but normal ones.

When the packet distribution conditions for one flow are determined to be met in operation S820, the device applies FS to the flow and distributes packets received through the flow to the plurality of cores selected in operations S830 and S840.

In operation S840, the device may identify the FS-applied flow from the pre-stored FS table, filter the packets of the identified flow according to the hash values, and distribute and allocate the filtered packets to the plurality of cores for FS processing designated through operation S830.

The device may, as necessary, make such settings to prevent other tasks than processing the packets distributed and allocated by the flow from adding to the selected cores for FS processing. For example, the device may make the settings to prevent at least any one of the selected cores from doing other tasks than processing the packets of the flow. Alternatively, the device may reallocate the flows, which are normal—not for FS processing—flows already allocated to at least one of the selected cores, to the other cores than the selected cores. In other words, the device reallocates the normal flows, which have been allocated to at least one of the selected cores, to other cores (e.g., standby cores with no flow allocation, cores not selected for FS processing, or cores with low usages among the standby cores or the cores not selected for FS processing).

Upon determining in operation S820 that the packet distribution conditions for a particular flow are not met, FS does not apply to the flow. For the flows to which FS does not apply, the other cores than the FS processing cores process packets in the manner at operation S850 according to the related art. For example, upon failing to meet the packet distribution conditions for the particular flow, FS processing for distributing the packets of the flow to the plurality of cores is not performed, and the existing cores continue to process all the packets of the flow.

Figure 9A:
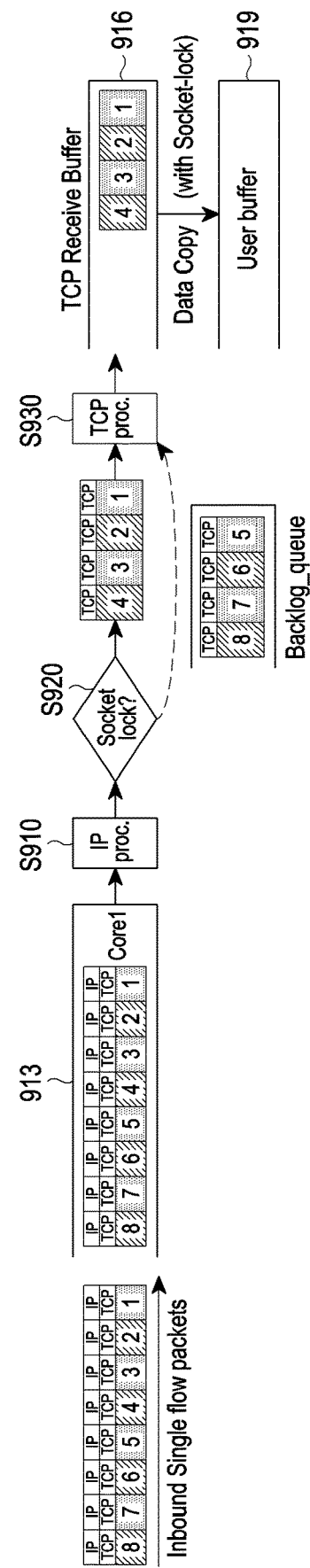
FIG. 9A illustrates one core being allocated to one flow according to an embodiment of the disclosure.
Figure 9B:
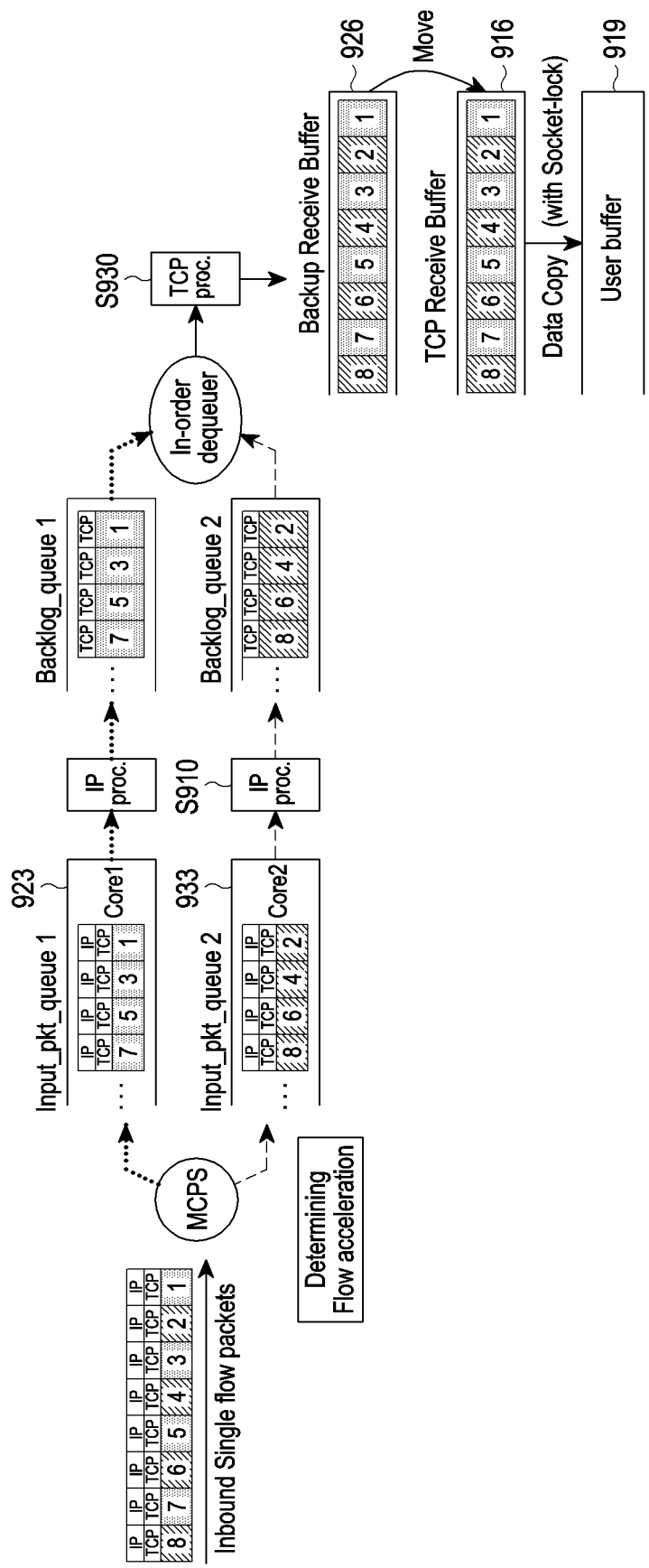
FIG. 9B illustrates a plurality of cores being allocated to one flow according to an embodiment of the disclosure.

FIG. 9A illustrates one core being allocated to one flow according to an embodiment of the disclosure. FIG. 9B illustrates a plurality of cores being allocated to one flow according to an embodiment of the disclosure.

FIGS. 9A and 9B are described together to compare operations of a single-core system and a multicore system.

Referring to FIGS. 9A and 9B, one flow may include a plurality of packets each of which may include a TCP header and an IP header. As described above in connection with FIG. 6A, the multicore system may receive encapsulated data. Decapsulating the encapsulated data may include removing the TCP header and removing the IP header. Specifically, decapsulating a plurality of packets in one flow may be stepwise performed considering the order of layers and may include decapsulating in the transport layer (hereinafter, a "TCP procedure," "TCP processing," "transport layer process," or "transport layer processing") as a process for removing the TCP header and decapsulating in the network layer (hereinafter, an "IP procedure," "IP processing," "network layer process," or "network layer processing") as a process for removing the IP header.

Referring to FIG. 9A, the single-core system may include eight packets, each including the TCP header and the IP header, in one flow. The flow including the eight packets may be positioned in a first queue contained in a first core 913.

The first core 913 may perform an IP procedure S910 and may then perform a TCP procedure S930. After having undergone the TCP procedure S930, packets may be stored in a TCP receive buffer 916. Then, the packets stored in the TCP receive buffer 916 may be provided to an application core or a user buffer 919 that is classified as the application layer. Specifically, after the IP procedure S910, the first core 913 may perform the TCP procedure S930 on only a preset number of packets and may perform a socket lock procedure S920 on the remaining packets to stop the TCP procedure S930. In this case, the sockets where the TCP procedure S930 has not been performed may be stored in a first backlog queue.

After the IP procedure S910, the socket lock procedure S920 may be carried out upon delivering the packets, which has undergone the TPC procedure S930, via the TCP receive buffer 916 to the user buffer 919, thereby preventing a collision between the process of storing in the TCP receive buffer 916 the packets which have undergone the TCP procedure S930 and the process of copying from the TCP receive buffer 916 to the user buffer 919. As a result, while copying packets from the user buffer 919 to the TCP receive buffer 916, the first core 913 may not perform the TCP procedure S930 on the packets which have not got through the TCP procedure S930. Thereafter, when the socket lock procedure S920 is released, the TCP procedure may be fulfilled on the four packets stored in the first backlog queue. While performing the socket lock procedure S920 in which the first core is prevented from doing the TCP procedure S930, no packets may be processed.

The multicore system shown in FIG. 9B may allocate a first packet and a second packet which are included in one flow to a second core 923 and a third core 933, respectively, processing the flow.

Referring to FIG. 9B, eight packets, each including the TCP header and the IP header, may be included in one flow. The second multicore system may distribute four packets to each of the second core 923 and the third core 933 through a multicore packet schedule (MCPS). According to an embodiment of the disclosure, the four packets distributed to the second core 923 may be positioned in the second queue included in the second core 923, and the four packets distributed to the third core 933 may be positioned in the third queue included in the third core 933.

After performing the IP procedure S910, the second core 923 and the third core 933 each may the results to the second backlog queue and the third backlog queue respectively corresponding to the second core 923 and the third core 933. The eight TCP packets which have undergone the IP procedure S910 may sequentially get through the TCP procedure S930, but not through the socket lock process, and may be stored in the backup receive buffer 926. The packets stored in the backup receive buffer 926, after moved to the TCP receive buffer 916, may be copied to the user buffer 919 without getting through the socket lock procedure S920.

In turn, the second multicore system of FIG. 9B may carry out the TCP procedure S930 without performing the socket lock procedure S920, presenting a more throughput than the first multicore system of FIG. 9A does.

According to an embodiment of the disclosure, the second core 923 and the third core 933 may have the same traffic processing capability. For example, when the second core 923 is a big-type core, the third core 933 may be a big-type core as well. When the second core 923 is a little-type core, the third core 933 may be a little-type core as well. Where the second core 923, which is a big-type core, and the third core 933, which is a little-type core, applies to FS, a big difference may occur between the processing time of the second core 923 and the processing time of the third core 933, and the second core 923 may be forced to wait until the processing of the third core 933 is complete.

Figure 10A:
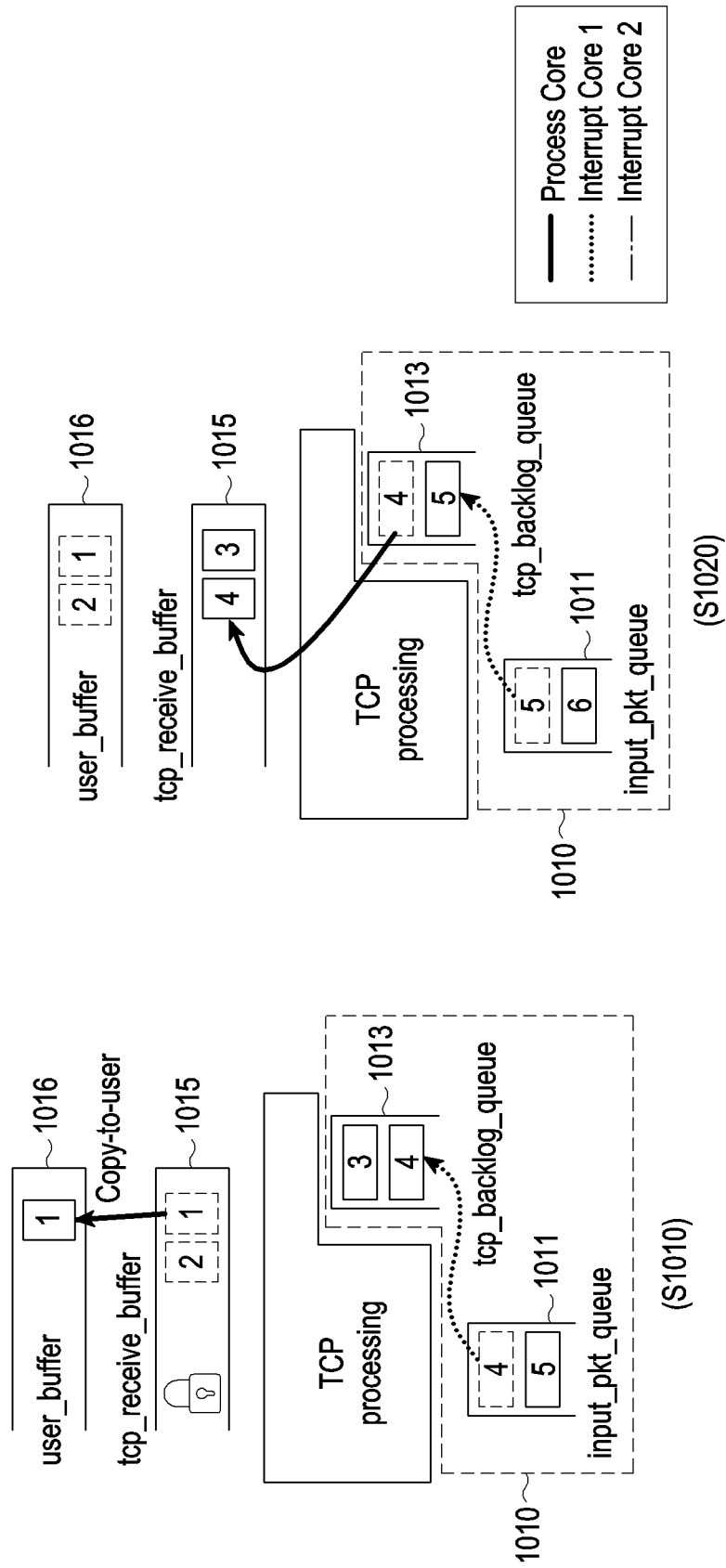
FIG. 10A illustrates a socket lock procedure in a single-core system as shown in FIG. 9A according to an embodiment of the disclosure.
Figure 10B:
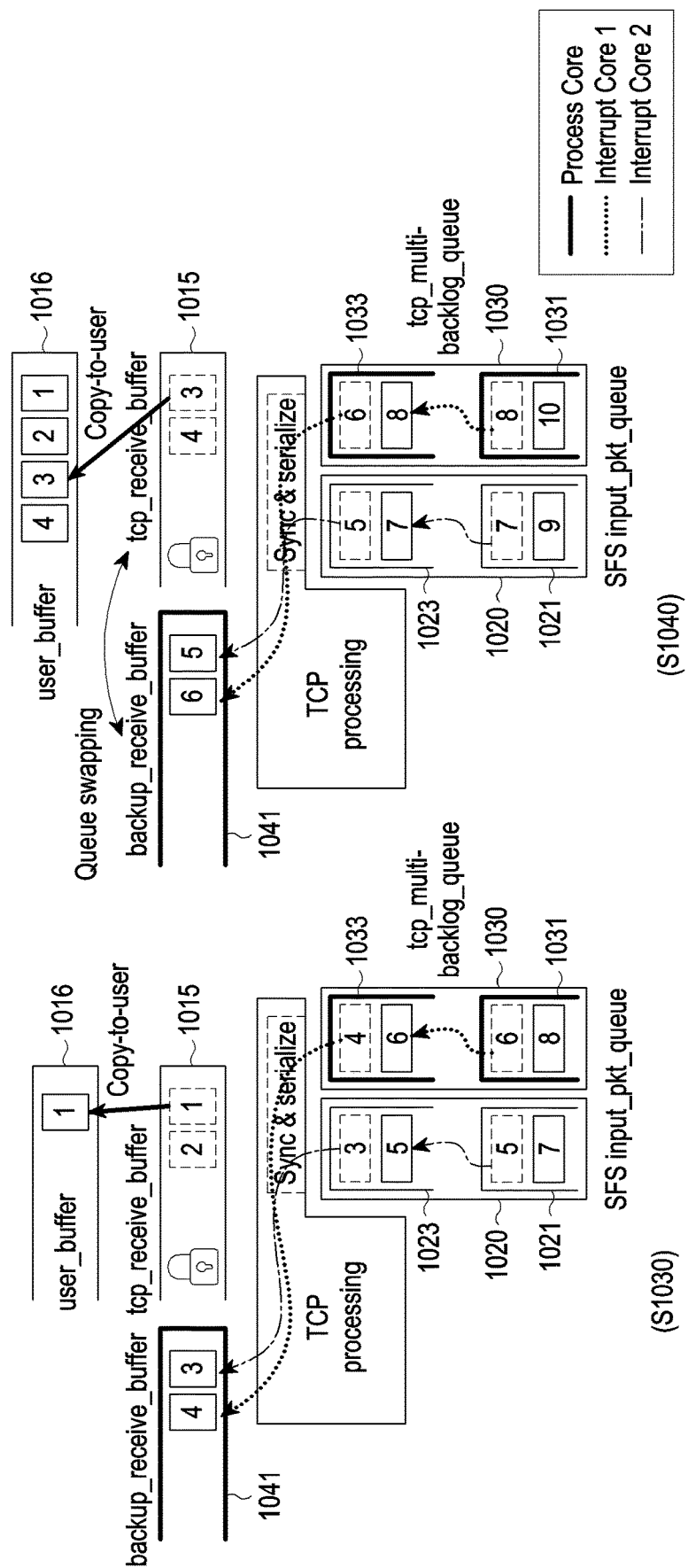
FIG. 10B illustrates a socket lock procedure in a multicore system as shown in FIG. 9B according to an embodiment of the disclosure.

FIG. 10A illustrates a socket lock procedure in a single-core system as shown in FIG. 9A. FIG. 10B illustrates a socket lock procedure in a multicore system as shown in FIG. 9B.

FIGS. 10A and 10B are described together to compare the respective socket lock procedures of a single-core system and a multicore system according to various embodiments of the disclosure.

Referring to FIG. 10A, the single-core system may include a first core 1010 to perform an IP procedure and a TCP procedure and a processor core belonging to the application layer.

The first core 1010 may include an input packet queue 1011 and a TCP backlog queue 1013. The first core 1010 may perform a TCP procedure on the packets that have undergone the IP procedure in the TCP backlog queue 1013. To perform the TCP procedure on next packets when the processor core copies (or moves) the packets that have undergone the TCP procedure to a user buffer 1016 in the TCP receive buffer 1015, the first core 1010 may move or copy the packets stored in the input packet queue 1011 to the TCP backlog queue 1013 (S1010).

When the first core 1010 moves or copies a preset number of packets among the packets stored in the input packet queue 1011 to the TCP backlog queue 1013, the socket lock procedure of the TCP procedure may be performed on the packets which have undergone the IP procedure in the TCP backlog queue 1013, and while performing the socket lock procedure, the processor core may copy the packets, which have got through the TCP procedure, from the TCP receive buffer 1015 to the user buffer 1016.

To perform the TCP procedure on next packets when the processor core moves the packets that have undergone the TCP procedure in the TCP backlog queue 1013 to the TCP receive buffer 1015, the first core 1010 may move or copy the packets stored in the input packet queue 1011 to the TCP backlog queue 1013 (S1020).

When the first core 1010 moves or copies the packets stored in the input packet queue 1011 to the TCP backlog queue 1013, the processor core may move or copy the packets which have undergone the TCP procedure to the TCP receive buffer 1015 (S1020).

Referring to FIG. 10B, the multicore system may include a second core 1020 and a third core 1030 to perform an IP procedure and a TCP procedure and a processor core belonging to the application layer.

The second core 1020 may include a second input packet queue 1021 and a second TCP backlog queue 1023. The third core 1030 may include a third input packet queue 1031 and a second TCP backlog queue 1033. The second core 1020 and the third core 1030 may perform a TCP procedure on the packets that have undergone the IP procedure in the TCP backlog queues 1023 and 1033. For example, the second core 1020 may perform the IP procedure or TCP procedure on odd-numbered packets, and the third core 1030 may perform the IP procedure or TCP procedure on even-numbered packets.

According to an embodiment of the disclosure, the times when the second core 1020 and the third core 1030 perform the TCP procedures in the TCP backlog queues 1023 and 1033 may be the same or differ from each other.

To perform the TCP procedure on next packets when the processor core copies (or moves) the packets that have undergone the TCP procedure to a user buffer 1016 in the TCP receive buffer 1015, the second core 1020 and third core 1030 may move or copy the packets stored in the input packet queues 1021 and 1031 to the TCP backlog queues 1023 and 1033. Simultaneously, the second core 1020 and the third core 1030 may move or copy the packets, which have undergone the TCP procedure in the TCP backlog queues 1023 and 1033, to the backup receive buffer 1041 (S1030).

According to an embodiment of the disclosure, the backup receive buffer 1041 may be a memory that the second core 1020 and the third core 1030 share or both may access.

According to an embodiment of the disclosure, the second core 1020 and the third core 1030 may move or copy the packets, which have undergone the TCP procedure, to the backup receive buffer 1041 in the order of the numbered packets.

According to an embodiment of the disclosure, while the second core 1020 performs the TCP procedure, the third core 1030 may perform the IP procedure. Conversely, while the second core 1020 performs the IP procedure, the third core 1030 may perform the TCP procedure.

For example, when the second core 1020 performs the TCP procedure on packet 3, the third core 1030 may not simultaneously perform the TCP procedure on TCP packet 4. This is why the TCP packets have order therebetween. This is described below with reference to FIG. 11C. At this time, the third core 1030 may perform the IP procedure until the TCP procedure is complete on packet 3.

While the first core 1010 performs the TCP procedure, the second core 1020 may perform the IP procedure. For example, while the first core 1010 performs the TCP procedure for packet 3, the second core 1020 performs the IP procedure for packet 6, and transmits the packet 6 that have undergone the IP procedure to the TCP backlog queue 1033.

Conversely, while the first core 1010 performs the IP procedure, the second core 1020 may perform the TCP procedure. For example, while the second core 1020 performs a TCP procedure for packet 4, the first core 1010 performs an IP procedure for packet 5 and transmits the packet 5 that have undergone the IP procedure to the TCP backlog queue 1023. According to an embodiment of the disclosure, during the time when the first core 1010 performs a TCP procedure and the second core 1020 performs an IP procedure, the processor core may move the packets that have undergone the TCP procedure from the TCP receive buffer 1015 to the user buffer 1016.

When the second core 1020 and the third core 1030 move or copy the packets which have undergone the TCP procedure in the TCP backlog queues 1023 and 1033 to the backup receive buffer 1041, a socket lock procedure may be performed in the TCP backlog queue 1023, 1033, and the processor core may copy the packets, which have undergone the TCP procedure, from the TCP receive buffer 1015 to the user buffer 1016 (S1030).

When the second core 1020 and the third core 1030 perform TCP procedure or IP procedure, and move or copy the packets stored in the input packet queues 1021 and 1031 to the TCP backlog queues 1023 and 1033, the processor core may move or copy the packet located in the TCP receive buffer 1015 to the user buffer 1016 (S1040). After, when the TCP receiving buffer 1015 is empty, the processor core may move (queue swapping operation) the packets that have undergone the TCP procedure from the backup receive buffer 1041 to the TCP receive buffer 1015.

According to an embodiment of the disclosure, the processor core may move or copy the packets to the TCP receive buffer 1015 considering the order of packets.

Figure 11A:
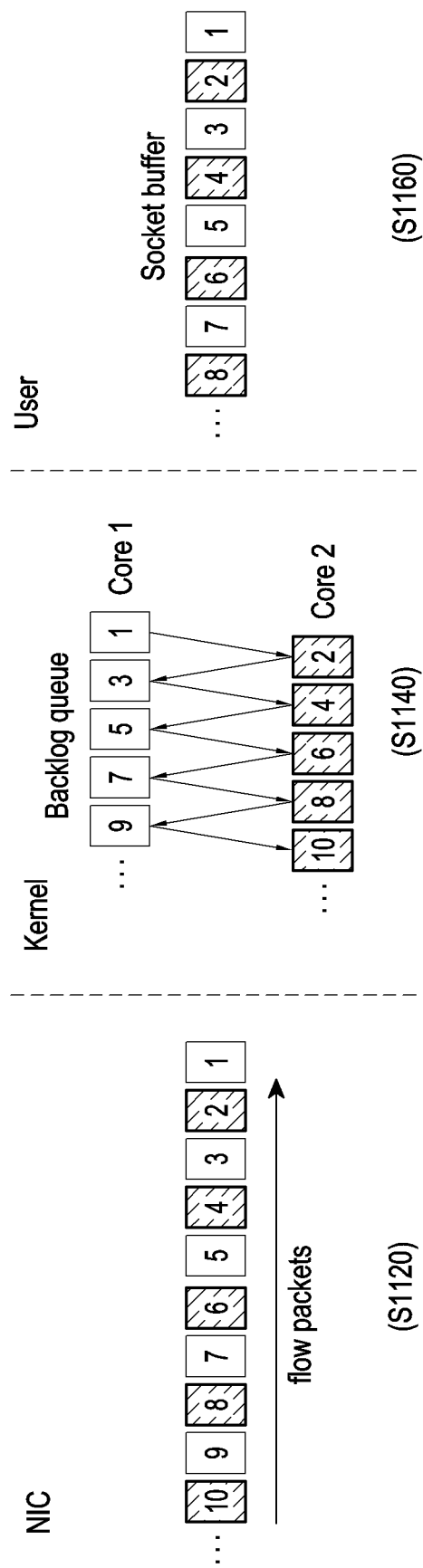
FIGS. 11A, 11B, and 11C illustrate a packet distribution process as shown in FIG. 8 according to various embodiments of the disclosure.
Figure 11B:
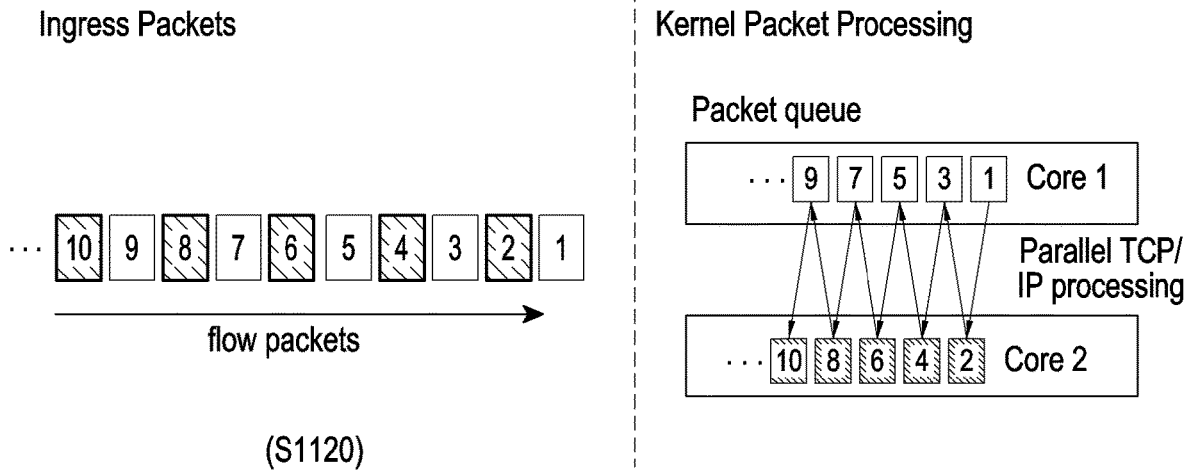
Figure 11C:
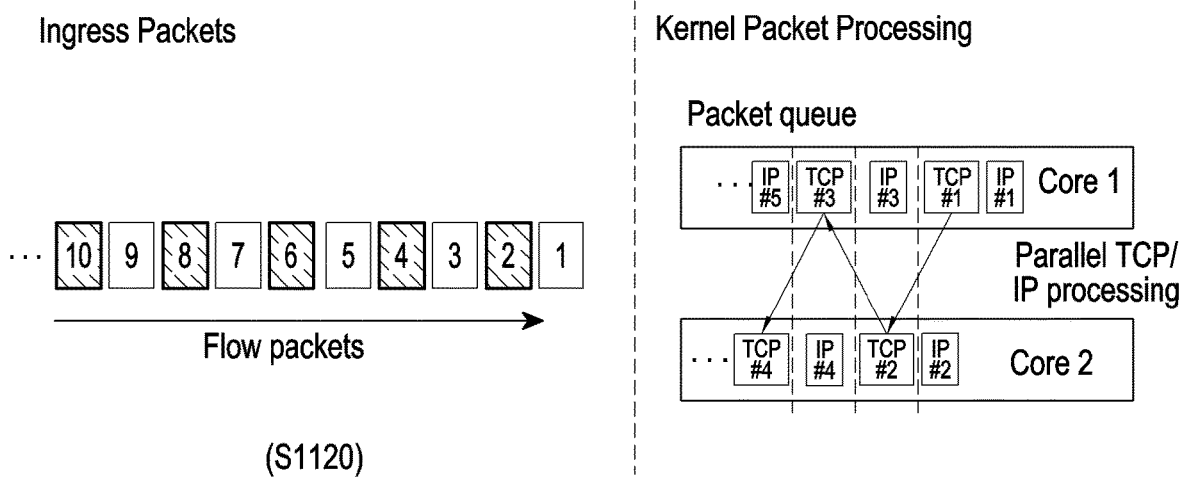

FIGS. 11A, 11B, and 11C illustrate a packet distribution process, wherein a device designates two cores Core 1 and Core 2 for the packets of FS-applied flow to perform FS processing according to various embodiments of the disclosure.

In the examples shown in FIGS. 11A, 11B, and 11C, the device has a layered structure including the transport layer and network layer (User-Kernel-NIC) under the application layer. Each rectangular box denotes a packet. The number in each box means the turn of the packet's arrival. Where Core 1 and Core 2 are set as cores for FS processing, the packets #1 to #10 of one flow which sequentially arrive at the network interface card (NIC) are added to the backlog queues of the cores Core 1 and Core 2 in the kernel in an interleaving manner as shown. Each core Core 1 and Core 2 processes the packets in the order added.

Referring to FIG. 11A, the packets #1 to #10 received through the network layer may be distributed in an interleaving manner to and processed by the plurality of cores in transport layer processing. The packets #1 to #10 into which one data stream is split are sequentially received (S1120) through one flow and alternately allocated to the selected cores Core 1 and Core 2 (S1140). The selected cores Core 1 and Core 2 may operate in parallel (S1140) and sequentially process the received packets, allowing the packets to be reassembled into a single data stream in the application layer (S1160).

For example, where N cores are designated as cores for FS processing, the device sequentially distributes and allocates the packets transmitted through the FS-applied flow to the N cores according to the addresses and allows the ith packet to be allocated to the i mod N core. By so doing, when the received packets are assembled into a single data stream, all of the N cores may operate in parallel, achieving an N times faster speed.

Such packet processing may be applied in two cases as shown in FIGS. 11B and 11C according to the processing layer between for the cores for FS processing.

Where the cores Core 1 and Core 2 for FS processing process only the network layer (IP layer), only packet processing timings may be adjusted as shown in FIG. 11B (Core 1 and Core 2 alternately perform network layer processing), and the cores may simultaneously process the packets received through one flow and deliver the packets to the transport layer (e.g., TCP or UDP). By such simultaneous packet processing, all of the multicore for FS processing may be operated in parallel, significantly enhancing the traffic processing speed of the FS-applied flow.

Where the cores for FS processing (Core 1 and Core 2) also perform transport layer processing as shown in FIG. 11C, the cores Core 1 and Core 2 may not simultaneously fulfill the TCP procedure due to the nature of sequential processing based on the status of the transport layer (Core 1 and Core 2 alternately perform transport layer processing).

Meanwhile, the plurality of packets (e.g., TCP packets) included in one flow need to be decapsulated in the order of the packets. The plurality of packets in the flow may have their respective turns in order and need to be decapsulated in order. Referring to FIG. 11C, the numbered TCP packets #1 to #4 have their respective priorities in order of number. For example, the larger number, the higher priority it has. For example, where the multicore system receives video packets (or voice packets or text packets), the order of video output matters, and thus, the order of the video packets may be critical to the video service.

Accordingly, while one core (e.g., Core 1) performs transport layer processing, the other (e.g., Core 2) may process up to the network layer of the next packet and transfer to the transport layer. For example, before one core (e.g., Core 1) completes the TCP procedure on TCP packet #1, the other core (e.g., Core 2) may not perform the TCP procedure on TCP packet #2.

While one core (e.g., Core 1) performs the TCP procedure on TCP packet #1, the other core (e.g., Core 2) may perform the IP procedure on IP packet #2, thereby enabling simultaneous processing on the network layer and the transport layer.

Figure 12:
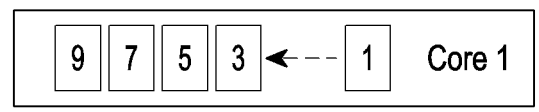
FIGS. 12 and 13 illustrate a scheme for addressing a timing mismatch and out-or-order processing between cores according to an embodiment of the disclosure.
Figure 12:
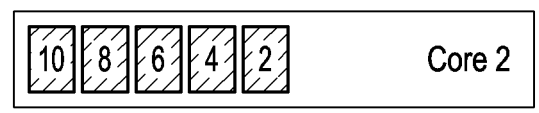
Figure 13:
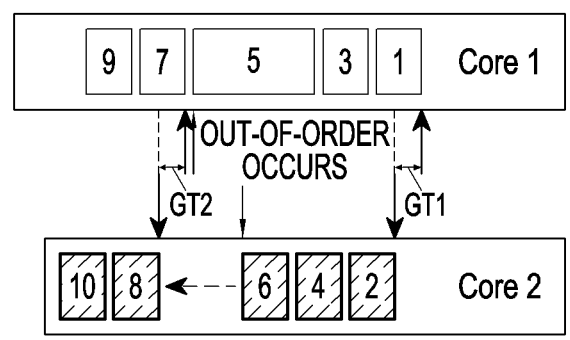

FIGS. 12 and 13 illustrate a scheme for addressing timing mismatch and out-or-order processing between cores according to an embodiment of the disclosure.

In the example shown in FIGS. 11A, 11B, and 11C, the device may allow the processing of each packet of Core 2 to commence only when the immediately prior packet of Core 1 begins to be processed, preventing the order of packet processing from being reversed.

For example, the processing of packet #2 of Core 2 may begin only upon initiating the processing of packet #1 of Core 1, and the processing of packet #3 of Core 1 may begin only upon initiating the processing of packet #2 of Core 2 as shown in FIG. 12.

Referring to FIG. 12, two cores exhibit a difference in packet processing time (a timing mismatch between the cores) when packets are distributed by FS processing to the backlog queues of the two cores in an interleaving manner.

Operating in the above-described manner in this case, Core 1 may wait until Core 2 starts packet processing and may then process packet #3, and this way addresses the out-of-order packet processing issue.

In this case, however, the latter started core is forced to wait while the earlier started core performs processing, so-called "busy waiting," lowering core resource use efficiency.

FIG. 13 illustrates an example in which as the processing time of a particular packet (e.g., packet #5 in FIG. 13) is relatively prolonged while packets are processed in an interleaving fashion, the out-of-order processing issue occurs between packet #5 and packet #6.

In this case, to prevent extra out-of-order processing, the device may further wait as long as a predetermined guard time GT2 after starting to process packet #7 and before starting to process packet #8 and may then process packet #8.

To reduce the likelihood that the order between the Core 1 packet and the Core 2 packet is reversed, i.e., the packets become out-of-order, the device may further wait as long as a predetermined guard time GT1 since the packet processing for Core 1 starts and may then start to process the packets of Core 2 in relation with the packet processing start time of Core 2.

The guard times GT1 and GT2 are set to be shorter than a mean packet processing time. For example, where the mean packet processing time is 10 µs, and the guard times are 3 µs, if the processing of packet #1 of Core 1 starts at 0 sec, the processing start time of packet #2 of Core 2 becomes at least 3 µs. Basically, a guardian time only applies to the first packet when Core 2 starts packet processing (GT1). This is why the subsequent packets are processed in predetermined intervals (e.g., at each mean packet processing time) since the first packet. Thereafter, where the processing time of a particular packet (e.g., packet #5) is prolonged a predetermined time or more, the guard time GT2 may be applied again.

Meanwhile, where the two cores significantly differ in the load of other tasks than packet processing, the inter-core timing mismatch and out-of-order processing issue described above in connection with FIGS. 12 and 13 may be more frequent.

According to an embodiment of the disclosure, the device may prevent other tasks than packet processing on the FS-applied flow from adding to the cores for FS processing. For example, the device may, as necessary, vary the settings to allow the other normal flows, which has been allocated to the cores for FS processing, to be processed by the other cores than the ones for FS processing. Further, the device may, as necessary, set the FS processing cores to be prevented from performing other tasks than packet processing on the FS-applied flow.

Figure 14A:
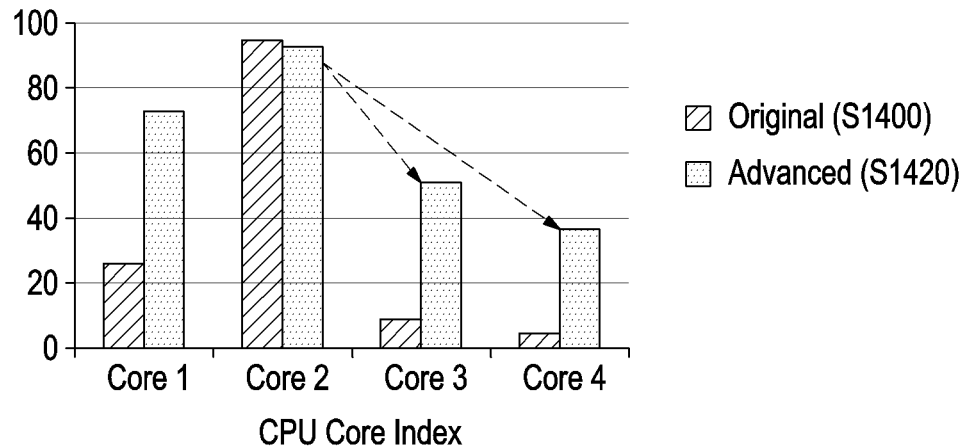
FIGS. 14A and 14B illustrate effects according to various embodiments of the disclosure.
Figure 14B:
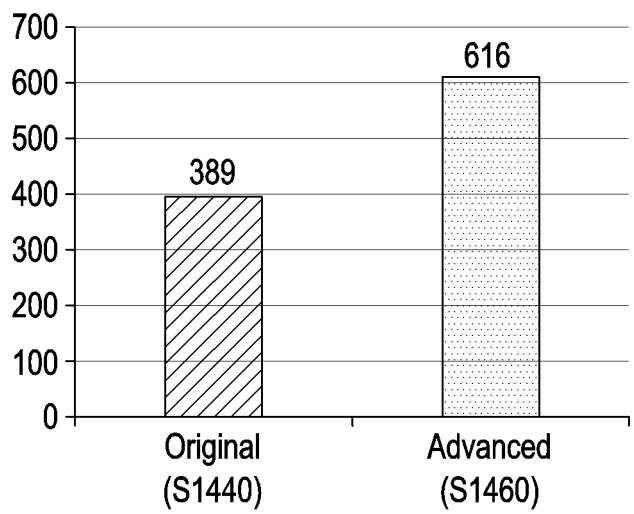

FIGS. 14A and 14B illustrate effects according to an embodiment of the disclosure.

Referring to FIG. 14A, a graph is illustrated for comparing core usages when a quad core-mobile terminal produces a single high-volume data flow between an example (S1400) and an embodiment (S1420) of the disclosure according to the related art. Referring to FIG. 14A, the example (S1400) fails to perform distributed processing on the single high-volume data flow, causing the packet processing loads to concentrate at Core 2 according to the related art. Conversely, it can be shown that, as per the embodiment (S1420), the packet processing load concentrating at Core 2 may be distributed to and processed by Core 3 and Core 4.

In the example of FIG. 14A, since Core 1 receives packets from the network layer of Core 1, distributes the packet processing to the other cores, and transfers a transport layer ACK (e.g., a TCP ACK) to the network layer, its usage increases when the traffic processing speed increases. Further, since Core 2 also performs packet processing of the application layer even after the packets of Core 2 are distributed to Core 3 and Core 4, the usage of Core 2 remains at a high level.

As such, the plurality of FS processing cores Core 2, Core 3, and Core 4 operate in parallel, receiving and simultaneously processing the packets of one flow, which concentrate at the particular core 2. Further, the FS processing cores Core 2, Core 3, and Core 4 may simultaneously process packets as per the processing layers, maximizing the traffic processing speed.

Referring to FIG. 14B, a graph is illustrated showing the respective data amounts (throughput or data reception speed), for one flow, of the example (S1440) and an embodiment (S1460) of the disclosure according to the related art. To compare data reception speeds, the TCP data reception speed was measured through an Iperf application using four 1 GHz CPU cores of a Wi-Fi access terminal. The results of the measurement revealed that, by applying the embodiment S1460 of the disclosure in which the packets of one flow are distributed to and processed by designated cores for simultaneous processing under the same condition, the data reception speed was increased by about 50% as compared with the example S1440 in which all of the packets in the single flow are processed by one core according to the related art.

Figure 15:
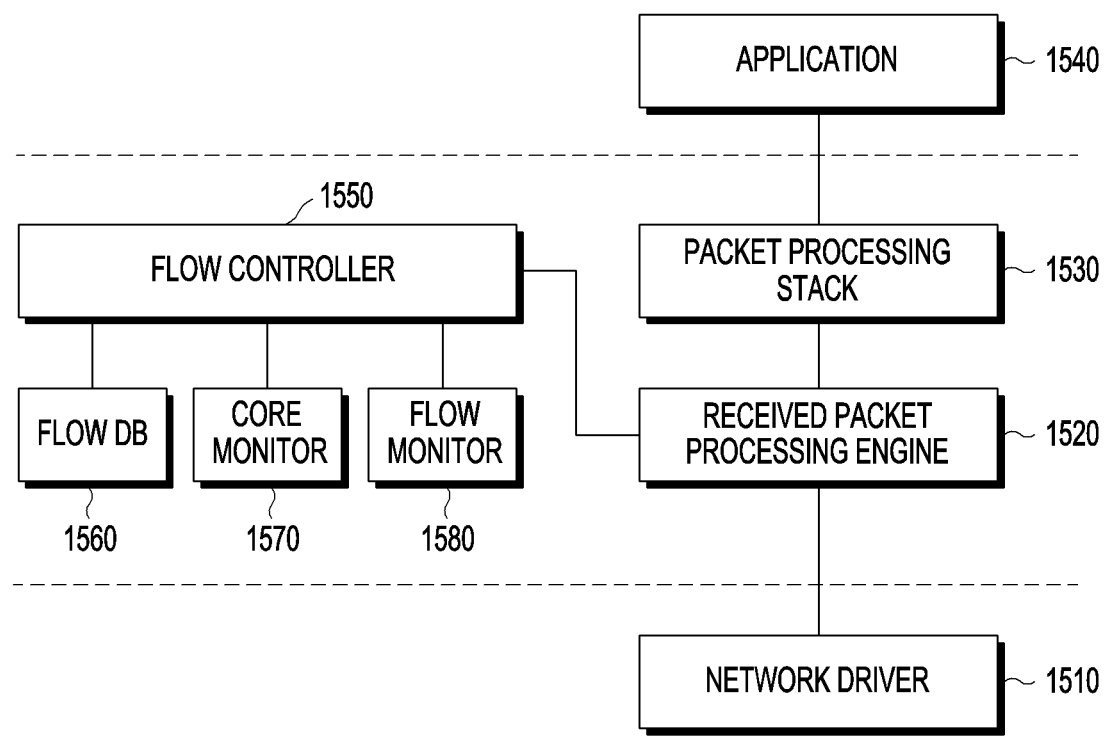
FIG. 15 illustrates a configuration of a multicore-based data processing device according to an embodiment of the disclosure.

FIG. 15 illustrates a configuration of a multicore-based data processing device according to an embodiment of the disclosure. According to an embodiment of the disclosure, the device is a receiver, and the network layers (IP) of a transmitter and the receiver are connected together via one or more flows for data communication.

Referring to FIG. 15, in a basic operation, the receiver receives data packets through a network driver 1510 from the flow connected with the transmitter. A received packet processing engine 1520 designates a core to process packets received through the network driver 1510 among all of the plurality of cores equipped in the device. Thereafter, the packet processing stack 1530 of the designated core processes the packets in the network environment layer (IP) and transport layer (TCP or UDP) and delivers the packets to the application 1540. In this case, the packets are sequentially processed by the cores in one-at-a-time manner.

A flow controller 1550 determines whether the packet distribution conditions for one flow are met, and upon meeting the packet distribution conditions, the flow controller 1550 selects cores for FS processing, to which the flow packets are to be distributed, among the plurality of cores.

To that end, the flow controller 1550 receives overload core information and/or information about the current maximum speed flow from a core monitor 1570 and/or a flow monitor 1580. Where at least one of the pieces of information exceeds a predetermined threshold and meets an additional condition for applying FS, the flow controller 1550 selects an FS-applied flow and a plurality of cores for FS processing of the flow, generates an FS table containing the flow information and the core information, and stores the FS table in a flow database (DB) 1560. The received packet processing engine 1520 may access the flow DB 1560 and the FS table in the flow DB 1560 through the flow controller 1550.

The flow DB 1560 stores the FS table generated through the flow controller 1550. The flow DB 1560 may store information, such as per-flow data amount, flow duration, and contexts (e.g., screen on/off, mobility, position, network connection, and used application) about the FS applied history (per-flow packet distribution history). Thereafter, when a context previously stored reoccurs, the received packet processing engine 1520 may detect it from the flow DB 1560 and apply FS to the flow in the context.

The core monitor 1570 monitors the per-core packet processing load, and when the packet throughput or usage of a particular core is not less than a predetermined threshold, the core monitor 1570 generates an event and transfers the core information or the usage information or information about the individual usages of all the cores to the flow controller 1550.

When an event occurs in the core monitor 1570, e.g., when the packet throughput or usage of a particular CPU core exceeds a predetermined threshold, periodically, or when a new flow is created, the flow monitor 1580 calculates the amount of data received for a predetermined time for each flow being used and delivers one or two pieces of flow information to the flow controller 1550 in descending order of the amount of data received.

The received packet processing engine 1520 basically allocates cores in units of flows and allows the packets received through one flow to be processed by one core. Further, the received packet processing engine 1520 identifies the FS-applied flow based on the FS table in the flow DB 1560, filters the packets received through the FS-applied flow, and distributes the packets to a plurality of cores designated for the flow. The backlog queues of the cores are positioned inside the packet processing stack 1530. The packets distributed through the received packet processing engine 1520 are delivered to the respective backlog queues of the designated cores and are processed.

Particular aspects of the disclosure may be implemented as computer readable codes in a computer readable recording medium. The computer readable recording medium is a data storage device that may store data readable by a computer system. Examples of the computer readable recording medium may include read only memories (ROMs), random access memories (RAMs), compact disc ROMs (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the disclosure may be readily interpreted by skilled programmers in the art to which the disclosure pertains.

The apparatuses and methods according to embodiments of the disclosure may be implemented in hardware, software, or a combination of hardware and software. Such software may be stored in a volatile or non-volatile storage device, such as a ROM or other storage devices, a memory, such as a RAM, a memory chip, a device or an integrated circuit, or a storage medium, such as, e.g., a CD, a digital video disc (DVD), a magnetic disk, or a magnetic tape, which allows for optical or magnetic recording while simultaneously read out by a machine (e.g., a computer). The methods according to embodiments of the disclosure may be implemented by a computer or a portable terminal including a controller and a memory, and the memory may be a machine-readable storage medium that may properly retain program(s) containing instructions for implementing the embodiments of the disclosure.

Accordingly, the disclosure encompasses a program containing codes for implementing the device or method set forth in the claims of this disclosure and a machine (e.g., computer)-readable storage medium storing the program. The program may be electronically transferred via any media, such as communication signals transmitted through a wired or wireless connection and the disclosure properly includes the equivalents thereof.

The apparatuses according to embodiments of the disclosure may receive the program from a program providing device wiredly or wirelessly connected thereto and store the same. The program providing apparatus may include a memory for storing a program including instructions enabling a program processing apparatus to perform a method according to an embodiment of the disclosure and data necessary for a method according to an embodiment of the disclosure, a communication unit for performing wired or wireless communication with a graphic processing apparatus, and a controller transmitting the program to the graphic processing apparatus automatically or as requested by the graphic processing apparatus.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational processes are performed over the computer or other programmable data processing devices and operate the computer or other programmable data processing devices may provide processes for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a "... unit" may include one or more processors.

As is apparent from the foregoing description, according to the disclosure, a multicore system may distribute and process data traffic in an efficient manner and accelerate data processing, thereby enhancing traffic processing performance.

According to the disclosure, cores are previously allocated as per the data volume of packets produced through a running application. Thus, an enhanced processing performance may be achieved for the application, such as one for video streaming that may produce a large quantity of data upon its initial operation, allowing the user a better experience.

Further, the usage of the cores may be lowered by distributing and processing traffic received by the application. Thus, current consumption on the cores may be reduced.

The embodiments herein are provided merely for better understanding of the disclosure, and the disclosure should not be limited thereto or thereby. The embodiments set forth herein are merely examples, and it will be apparent to one of ordinary skill in the art that various changes may be made thereto without departing from the scope of the disclosure. The scope of the disclosure should be defined by the following claims.

Further, the embodiments may be practiced in combination. For example, some of the embodiments of the disclosure may be combined together to be operated on a server (or router) and a client. Although the embodiments are proposed in association with LTE systems, various modifications thereto may apply to other various systems, such as 5G or new radio (NR) systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for processing data in a terminal including multiple cores, the method comprising:
   determining whether a condition for a first packet flow among one or more packet flows for data communication is met;
   if the condition is met, selecting cores to distribute packets of the first packet flow from among the multiple cores;
   allocating packets received through the first packet flow to the selected cores; and
   operating the selected cores in parallel to process the packets allocated from the first packet flow,
   wherein other packet flows other than the first packet flow, which have been allocated to the selected cores, are reallocated to at least one core other than the selected cores,
   wherein the packets, which are sequentially received through the first packet flow, are alternately allocated to and processed by the selected cores,
   wherein the selected cores include a first core and a second core, wherein the second core is configured to start the packet processing a preset guard time after the first core starts an immediately prior packet processing, and wherein the preset guard time is set to be less than a mean packet processing time of the second core.

2. The method of claim 1, wherein upon operating the selected cores in parallel to process the packets allocated from the first packet flow, the first core and the second core are configured to simultaneously process network layer processing on packets allocated to the first core and packets allocated to the second core.

3. The method of claim 1, wherein the first core and the second core are configured to perform both network layer processing and transport layer processing, and wherein the second core is configured to perform the network layer processing on a next packet while the first core performs the transport layer processing on a current packet.

4. The method of claim 1, wherein whether the condition is met is determined based on one or more of a data reception speed of the first packet flow, context information about a packet distribution history of the first packet flow, a packet throughput of a core to which the first packet flow is allocated, or a usage of the core, and wherein the determining of whether the condition of the first packet flow is met is performed periodically, if a core whose usage is not less than a threshold among the multiple cores occurs, or if a new packet flow is created.

5. The method of claim 1, wherein the cores to which the packets of the first packet flow are to be distributed are configured to be selected based on a packet throughput or usage of each core.

6. The method of claim 1, wherein processing the packets distributed and allocated from the first packet flow includes:

performing, by the first core, transport layer processing on a first packet among a plurality of packets including a transmission control protocol (TCP) header and an internet protocol (IP) header included in the first packet flow, and performing, by the second core, network layer processing on a second packet while the first core performs the transport layer processing.

7. The method of claim 6, further comprising:

moving, by a third core, the first packet on which the transport layer processing is performed by the first core to a buffer included in an application layer; and stopping transport layer processing on a third packet, which is a packet next to the first packet, while the third core moves the first packet on which the transport layer processing is performed.

8. The method of claim 7, wherein the stopping of the transport layer processing on the third packet which is the packet next to the first packet includes moving, by the first core, the third packet to a buffer where transport layer processing is performed.

9. A terminal including multiple cores, the terminal comprising:

a transceiver configured to receive packets through a first packet flow among one or more packet flows for data communication; and at least one processor configured to:

determine whether a condition for the first packet flow is met, if the condition is met, select cores to distribute the packets of the first packet flow from among the multiple cores, allocate the packets received through the first packet flow by the transceiver to the selected cores, and reallocate other packet flows other than the first packet flow, which have been allocated to the selected cores, to at least one core other than the selected cores, wherein the selected cores are configured to operate in parallel to process the packets allocated from the first packet flow, wherein the packets, which are sequentially received through the first packet flow, are alternately allocated to and processed by the selected cores, wherein the selected cores include a first core and a second core, wherein the second core is configured to start the packet processing a preset guard time after the first core starts an immediately prior packet processing, and wherein the preset guard time is set to be less than a mean packet processing time of the second core.

10. The terminal of claim 9, wherein the first core and the second core are configured to simultaneously perform network layer processing on packets allocated to the first core and the second core.

11. The terminal of claim 9, wherein the first core and the second core are configured to perform both network layer processing and transport layer processing, and wherein the second core is configured to perform the network layer processing on a next packet while the first core performs the transport layer processing on a current packet.

12. The terminal of claim 9, wherein the determining of whether the condition for the first packet flow is met is based on one or more of a data reception speed of the first packet flow, context information about a packet distribution history of the first packet flow, a packet throughput of a core to which the first packet flow is allocated, or a usage of the core.

13. The terminal of claim 9, wherein the cores to which the packets of the first packet flow are to be distributed are configured to be selected based on a packet throughput or usage of each core.

14. A method for allocating cores by an electronic device with multiple cores, the method comprising:

detecting an application running on the electronic device;

identifying packet flow information about the detected application; and allocating a first core and a second core to process packets generated through the detected application based on the packet flow information, wherein packet flows generated through at least one application other than the detected application, which have been allocated to the first core and the second core, are reallocated to at least one third core other than the first core and the second core, wherein the packets which are generated through the detected application, are alternately allocated to and processed by the first core and the second core, wherein the second core is configured to start the packet processing a preset guard time after the first core starts an immediately prior packet processing, and wherein the preset guard time is set to be less than a mean packet processing time of the second core.

15. The method of claim 14, wherein the packet flow information includes at least one of IP address information, port information, protocol information, or hash information about a packet flow.

16. The method of claim 14, wherein the allocating of the first core and the second core includes:
   determining whether the detected application belongs to a preset application group, and
   when the detected application belongs to the preset application group, allocating two preset cores as the first core and the second core to process the packets generated through the detected application.

17. An electronic device with multiple cores, the electronic device comprising:
   the multiple cores configured to process packets; and
   at least one processor configured to:
      detect an application running on the electronic device,
      identify packet flow information about the detected application, and
      allocate a first core and a second core to process packets generated through the detected application based on the packet flow information,
   wherein packet flows generated through at least one application other than the detected application, which have been allocated to the first core and the second core, are reallocated to at least one third core other than the first core and the second core,
   wherein the packets which are generated through the detected application, are alternately allocated to and processed by the first core and the second core,
   wherein the second core is configured to start the packet processing a preset guard time after the first core starts an immediately prior packet processing, and
   wherein the preset guard time is set to be less than a mean packet processing time of the second core.

18. The electronic device of claim 17, wherein the at least one processor is further configured to:
   determine whether the detected application belongs to a preset application group, and
   when the detected application belongs to the application group, allocate two preset cores as the first core and the second core to process the packets generated through the detected application.

* * * * *